(12) United States Patent
Shankar et al.

(10) Patent No.: US 8,032,764 B2
(45) Date of Patent: Oct. 4, 2011

(54) ELECTRONIC DEVICES, INFORMATION PRODUCTS, PROCESSES OF MANUFACTURE AND APPARATUS FOR ENABLING CODE DECRYPTION IN A SECURE MODE USING DECRYPTION WRAPPERS AND KEY PROGRAMMING APPLICATIONS, AND OTHER STRUCTURES

(75) Inventors: Narendar M. Shankar, Santa Clara, CA (US); Erdal Paksoy, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 982 days.

(21) Appl. No.: 11/559,440

(22) Filed: Nov. 14, 2006

(65) Prior Publication Data

US 2008/0114993 A1    May 15, 2008

(51) Int. Cl.
    *G06F 12/14*    (2006.01)
(52) U.S. Cl. .......................... 713/193; 713/169
(58) Field of Classification Search ........... 380/200–204
    See application file for complete search history.

(56) References Cited

U.S. PATENT DOCUMENTS

| 5,757,919 | A | 5/1998 | Herbert et al. |
|---|---|---|---|
| 6,188,995 | B1 * | 2/2001 | Garst et al. .................. 705/59 |
| 6,201,871 | B1 | 3/2001 | Bostley, III et al. |
| 6,246,971 | B1 * | 6/2001 | Kermani et al. ............. 702/119 |
| 6,385,727 | B1 | 5/2002 | Cassagnol et al. |
| 6,397,331 | B1 | 5/2002 | Ober et al. |
| 6,640,304 | B2 | 10/2003 | Ginter et al. |
| 6,678,744 | B2 * | 1/2004 | Moon et al. .................. 719/328 |
| 6,708,274 | B2 | 3/2004 | Herbert et al. |
| 6,854,046 | B1 | 2/2005 | Evans et al. |
| 7,013,484 | B1 | 3/2006 | Ellison et al. |
| 7,127,612 | B1 * | 10/2006 | Ishibashi ..................... 713/169 |

(Continued)

FOREIGN PATENT DOCUMENTS

EP    1429224 A1    6/2004

OTHER PUBLICATIONS

Suh, et al., "Efficient Memory Integrity Verification and Encryption for Secure Processors," IEEE Computer Society 36th Int'l. Symposium on Microarchitecture, Dec. 3-5, 2003, Figs. 1-6.

(Continued)

*Primary Examiner* — Christian Laforgia
*Assistant Examiner* — Brian Olion
(74) *Attorney, Agent, or Firm* — Wade J. Brady, III; Frederick J. Telecky, Jr.

(57) ABSTRACT

An electronic device (1640) includes a non-volatile store (1620) holding a plurality of encrypted sub-applications (SubApp n), and application-specific identifications (ASIDs) to respectively identify the encrypted sub-applications (SubApp n), and at least one wrapper having a representation of code to call (2220) a function (KPPA2) and supply a said application-specific identification (ASID) to the called function (KPPA2) to determine a storage location (UU) and access (2250) the storage location (UU) for contents and to call (2260) for decryption of the encrypted sub-application (SubApp n) using the contents of the storage location (UU) as a key; and a processor (1660) coupled to said non-volatile store (1620) and operable to access the representation of code and execute the code (2220, 2260). Various electronic devices, information products, processes of manufacture, and apparatus are disclosed and claimed.

14 Claims, 13 Drawing Sheets

U.S. PATENT DOCUMENTS

| | | | |
|---|---|---|---|
| 2002/0099946 A1 | 7/2002 | Herbert et al. | |
| 2002/0129245 A1 | 9/2002 | Cassagnol et al. | |
| 2002/0194470 A1* | 12/2002 | Grupe | 713/153 |
| 2003/0056107 A1 | 3/2003 | Cammack et al. | |
| 2003/0133574 A1 | 7/2003 | Caronni et al. | |
| 2003/0140205 A1 | 7/2003 | Dahan et al. | |
| 2003/0140244 A1 | 7/2003 | Dahan et al. | |
| 2003/0140245 A1 | 7/2003 | Dahan et al. | |
| 2004/0025010 A1 | 2/2004 | Azema et al. | |
| 2004/0039911 A1* | 2/2004 | Oka et al. | 713/175 |
| 2004/0054907 A1 | 3/2004 | Chateau et al. | |
| 2004/0186994 A1 | 9/2004 | Herbert et al. | |
| 2005/0079868 A1 | 4/2005 | Shankar et al. | |
| 2005/0268092 A1 | 12/2005 | Shankar et al. | |
| 2005/0268095 A1 | 12/2005 | O'Connor | |
| 2006/0129848 A1 | 6/2006 | Paksoy et al. | |
| 2006/0179489 A1* | 8/2006 | Mas Ribes | 726/27 |
| 2007/0050849 A1* | 3/2007 | Takashima | 726/26 |
| 2007/0294181 A1* | 12/2007 | Chheda et al. | 705/59 |

OTHER PUBLICATIONS

Baron, "Five Chips From TI—Or, Is It Six?" Microprocessor Report, In-Stat/MDR, Mar. 17, 2003, Figs. 1, 3, 4.

Claessens, et al., "How can mobile agents do secure electronic transactions on untrusted hosts? A survey of the security issues and the current solutions." ACM Transactions on Internet Technology, Feb. 2003, sections 2, 3.1, 3.4.

Lie, et al., "Architectural Support for Copy and Tamper Resistant Software," in Proceedings of the 9th Int'l Conference on Architectural Support for Programming Languages and Operating Systems (ASPLOS-IX), pp. 169-177, Nov. 2000, Figs. 1-2.

Smith, et al., "Building A High-Performance, Programmable Secure Coprocessor," In Computer Networks (Special Issue on Computer Network Security), vol. 31, pp. 831-860, Apr. 1999, Figs. 1, 4-6, 12-16.

Suh, et al., "AEGIS: Architecture for Tamper-Evident and Tamper-Resistant Processing," In Proceedings of the 17th Int'l Conference on Supercomputing, Jun. 2003, Figs. 1, 3-5, Table 1.

* cited by examiner

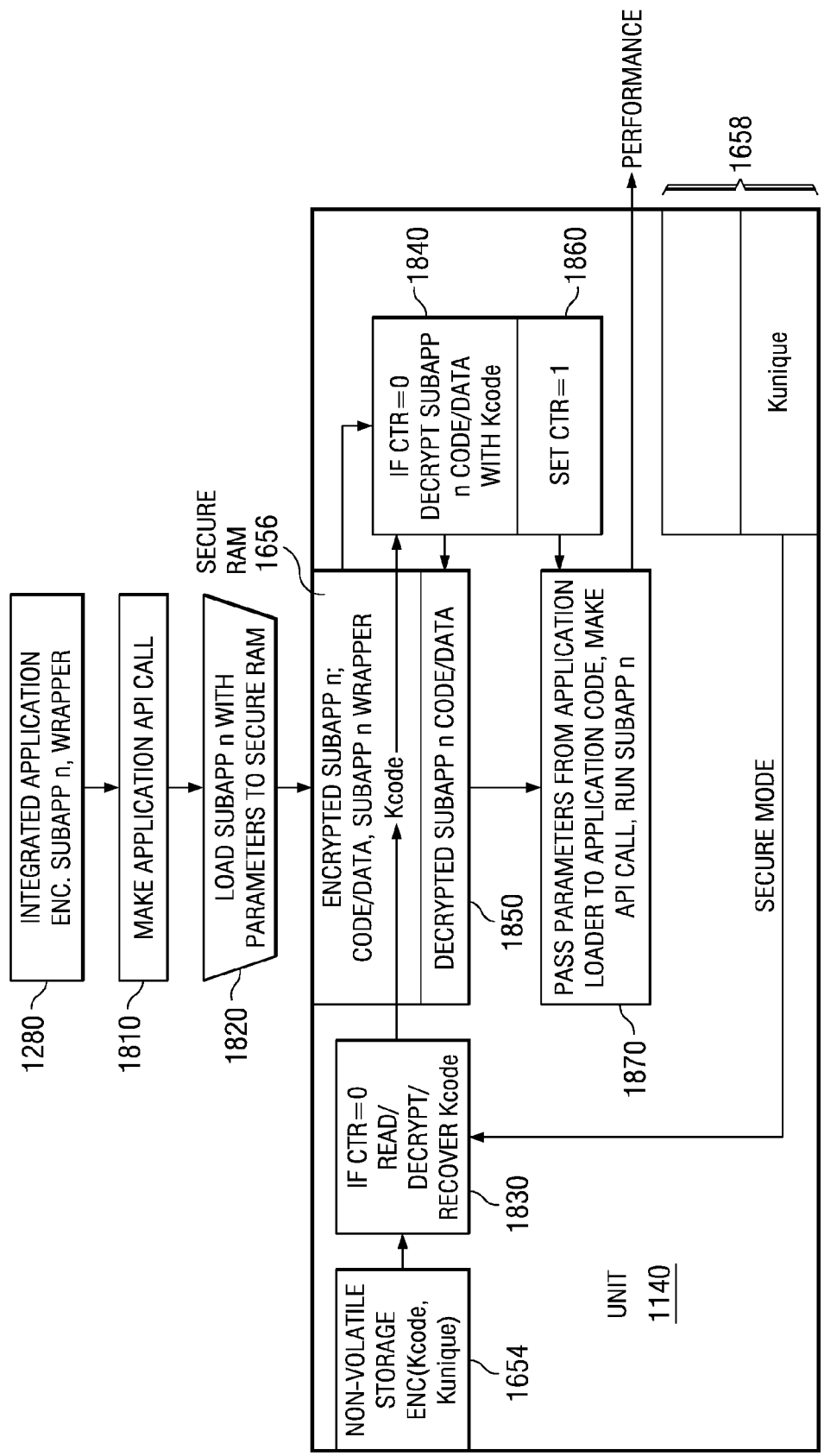

US 8,032,764 B2

ELECTRONIC DEVICES, INFORMATION PRODUCTS, PROCESSES OF MANUFACTURE AND APPARATUS FOR ENABLING CODE DECRYPTION IN A SECURE MODE USING DECRYPTION WRAPPERS AND KEY PROGRAMMING APPLICATIONS, AND OTHER STRUCTURES

CROSS-REFERENCE TO RELATED APPLICATIONS

U.S. non-provisional patent application TI-38214 "Methods, Apparatus, And Systems For Securing SIM (Subscriber Identity Module) Personalization And Other Data On A First Processor And Secure Communication Of The SIM Data To A Second Processor" U.S. Ser. No. 11/100,690 filed Apr. 7, 2005, is hereby incorporated herein by reference.

U.S. non-provisional patent application TI-38213 "Methods, Apparatus, and Systems for Secure Demand Paging and Other Paging Operations for Processor Devices" U.S. Ser. No. 11/426,597 filed Jun. 27, 2006, is hereby incorporated herein by reference.

U.S. non-provisional patent application TI-38212 "Methods, Apparatus And Systems With Loadable Kernel Architecture For Processors" U.S. Ser. No. 11/100,689 filed Apr. 7, 2005, is hereby incorporated herein by reference.

U.S. non-provisional patent application TI-36947 "Device Bound Flashing/Booting For Cloning Prevention" U.S. Ser. No. 10/800,513 filed Mar. 15, 2004, is hereby incorporated herein by reference.

U.S. non-provisional patent application TI-34919 "Computing Platform Certificate" U.S. Ser. No. 10/618,859 filed Jul. 14, 2003, is hereby incorporated herein by reference.

U.S. non-provisional patent application TI-32366 "Secure Bootloader for Securing Digital Devices" U.S. Ser. No. 09/954,124 filed Sep. 17, 2001, is hereby incorporated herein by reference.

STATEMENT REGARDING FEDERALLY SPONSORED RESEARCH OR DEVELOPMENT

Not applicable.

BACKGROUND OF THE INVENTION

This invention is in the field of information and communications, and is more specifically directed to improved electronic devices, and apparatus for information and communication processing, information products, and processes of manufacture. Without limitation, the background is further described in connection with wireless and wireline communications.

Wireless communications of many types have gained increasing popularity in recent years. The mobile wireless telephone or cellular telephone has become ubiquitous around the world. Mobile telephony communicates video, audio and digital data, in addition to voice. The market for portable devices such as cell phones and content players is expanding with many more features and applications. Wireless data communications in wireless local area networks (WLAN) and short-range wireless data communication are also proliferating.

Security is important in both wireline and wireless communications for improved security of retail and other business commercial transactions in electronic commerce and wherever personal and/or commercial privacy is desirable. Added features and security add further processing tasks to the communications system where cost and power dissipation are already important concerns.

Ensuring the confidentiality of code and digital rights managed media content is important. In some cases, it is desired that software also be usable only on a particular device such as one single handset or product unit. In other words, if the software were transferred to another handset, the software should fail to operate on that other handset. Furthermore, the software code should be protected from compromise while it is being programmed into the electronic device on the factory floor.

It is desirable to improve information products such as software and/or content for secure distribution on media or over the Internet and other networks.

Keeping the cost of manufacture low, increasing the efficiency of obtaining software and media content performances, and maintaining high performance and low power dissipation are important goals in electronic devices and processes of manufacture.

It would be highly desirable to solve any or all of the above problems, as well as other problems by improvements to be described hereinbelow.

SUMMARY OF THE INVENTION

Generally and in a form of the invention, an electronic device includes a non-volatile store holding a plurality of encrypted sub-applications, and application-specific identifications to respectively identify the encrypted sub-applications, and at least one wrapper having a representation of code to call a function and supply a said application-specific identification to the called function to determine a storage location and access the storage location for contents and to call for decryption of the encrypted sub-application using the contents of the storage location as a key; and a processor coupled to said non-volatile store and operable to access the representation of code and execute the code.

Generally, another form of the invention involves a process of manufacturing an electronic device including a non-volatile storage coupled with a processor chip that has a stored chip-specific key and a volatile on-chip secure memory. The process of manufacturing comprises loading the volatile on-chip secure memory with a key programming application and with a first encrypted form of a first key encrypted by a second key, operating the processor chip by the key programming application in a secure mode to decrypt the first encrypted form of the first key to recover the first key itself inside the processor chip, generate a second encrypted form of the first key so that the first key is encrypted by the chip-specific key inside the processor chip, and store the second encrypted form of the first key in non-volatile form somewhere in the electronic device; and providing a key retrieval application in non-volatile form somewhere in the electronic device to call for decrypting the second encrypted form of the first key at run-time.

Generally and in yet another form of the invention, an information product includes a plurality of encrypted sub-applications, application-specific identifications to respectively identify the encrypted sub-applications, and at least one wrapper having a representation of code to call a function and supply a said application-specific identification to the called function to determine a decryption key and to call for decryption of the encrypted sub-application using the decryption key.

Generally and in still another form of the invention, a process of manufacturing an information product includes providing application code, dividing the application code into the a plurality of sub-applications, encrypting the sub-applications with at least one key, adding a plurality of sub-application wrappers and identifications corresponding to the encrypted sub-applications respectively, and signing as a whole the sub-applications, the wrappers, and the identifications all together.

Generally another further form of the invention is an apparatus for processing a unit of an electronic device. The electronic device unit to be processed has a processor chip and is for use with an encrypted application encrypted with a first key. The apparatus for processing the unit includes a control processor, an interface coupled to said control processor, and a storage coupled to said control processor and storing a key programming application including instruction code to operate the processor chip to cryptographically process the first key, said control processor operable to deliver the key programming application from said storage into the processor chip via said interface.

Other forms of the invention involving processes of manufacture, articles of manufacture, processes of manufacture and methods of operation, circuits, devices, and systems are disclosed and claimed.

BRIEF DESCRIPTION OF THE DRAWINGS

FIG. 7 is a flow diagram of a run-time process of control and signal processing of the inventive production units of FIG. 1.

Corresponding numerals indicate corresponding parts in the Figures of drawing except where the context plainly indicates otherwise.

DETAILED DESCRIPTION OF EMBODIMENTS

Figure 1:
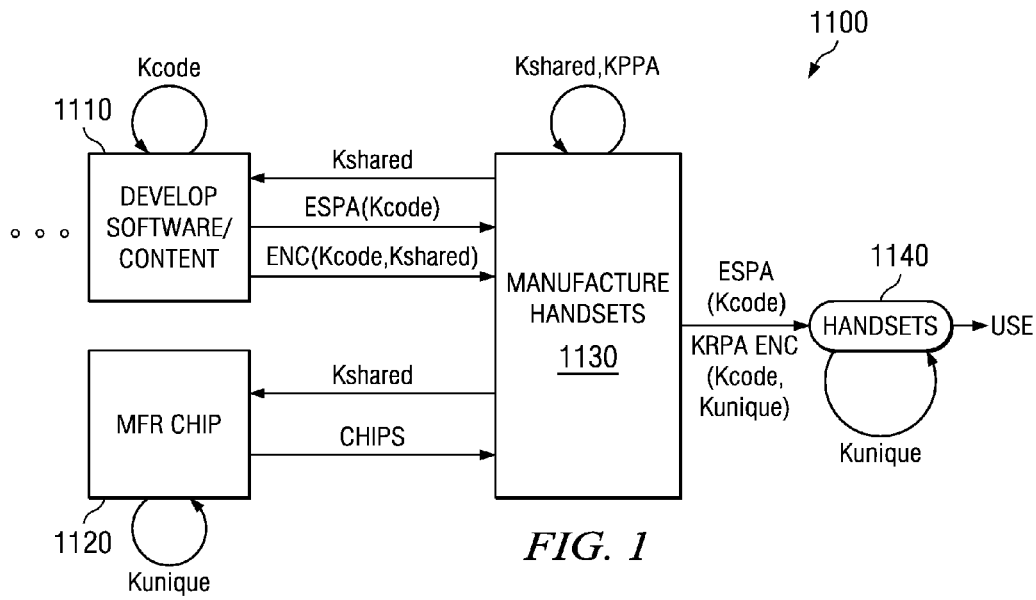
FIG. 1 is a flow diagram of an inventive process of manufacturing involving manufacture of inventive production units supported by inventive development of software and content and chip making.

In FIG. 1, different companies, entities or divisions in a process of manufacture 1100 are or can be independently responsible for their respective type of key Kcode, Kshared, Kunique. For instance, process 1110 for development of a software application and/or content includes establishing a symmetric key Kcode. Kcode in some embodiments of the process is suitably made to vary or differ for each application and each sub-application. Key Kcode is encoded with a shared key Kshared. A chip making process 1120 includes establishing a chip-specific key Kunique and manufacturing a respectively chip-specific unique key value of the key Kunique into each processor chip. Part of a process 1130 establishes a shared key Kshared and supplies Kshared to the Application Developer 1110. In some processes the chip maker 1120 receives Kshared as well. The key Kshared is also used on the system manufacturing floor.

Each player in the supply chain of process 1100 can establish at least one key for which that player is alone responsible, even if a given key moves through the chain or gets shared. For example the development process 1110 can establish Kcode, process 1120 can establish Kunique, and process 1130 can establish Kshared. The process is flexible so that one player can establish more than one key too.

In FIG. 1, the software/content development process 1110 provides an encrypted, signed protected application (ESPA) that is encrypted using the key Kcode, and also provides an encrypted form ENC(Kcode, Kshared) of key Kcode encrypted with the shared key Kshared. Chip making process 1120 supplies manufacturing process 1130 with chips that have respective values of both keys Kunique and Kshared provided or built securely into each chip. Manufacturing process 1130 provides handsets 1140 or other types of product units that have ESPA with a cryptographic signature as a protected application ESPA(Kcode). A key programming protected application KPPA is provided for use in the manufacturing process 1130. KPPA operates on or in the handset to change ENC (Kcode, Kshared) so that key Kcode can be encrypted with key Kunique instead of Kshared. An encrypted form ENC (Kcode, Kunique) results. KPPA is then no longer needed. A key retrieval protected application KRPA is provided in the handset to recover key Kcode from ENC (Kcode, Kunique) and decrypt the encrypted protected application ESPA(Kcode) in use.

In connection with an information product which can be delivered on physical media or over a network, the words herein "application" and "sub-application" refer to any one or more of content, data and instruction code.

Figure 2:
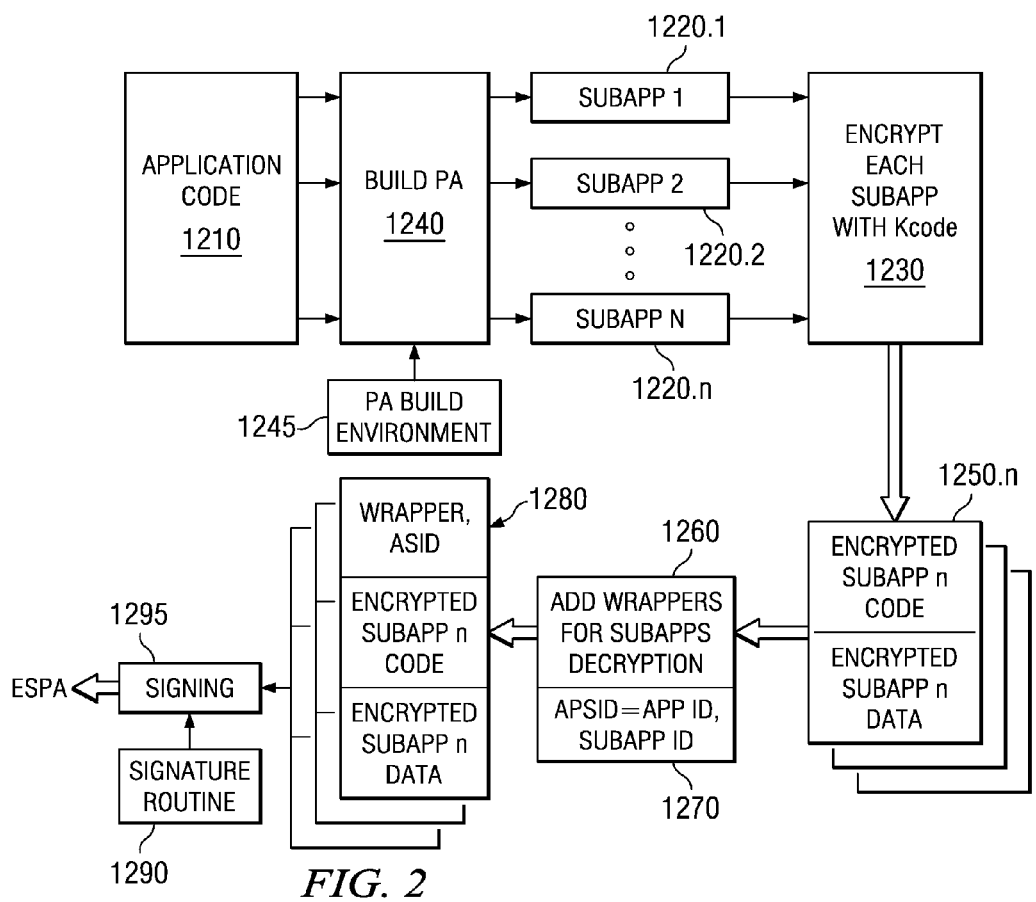
FIG. 2 is a more detailed flow diagram of an inventive process for an information product of software and for content in the process of FIG. 1.

In FIG. 2, an embodiment of process 1110 has a subprocess for making encrypted application code ESPA (Kcode) from original application code. A process 1240 builds the protected application using a build environment 1245 and facilitates the steps of FIG. 2.

Application code 1210 is divided into a collection of sub-applications SubApp 1220.1, SubApp 1220.2, and so forth to SubApp 1220.N. For simplicity, each respective SubApp is given the general index SubApp n. Each SubApp n is encrypted with a value of a symmetric key Kcode at a step 1230. As a result of step 1230, each sub-application SubApp n has encrypted application SubApp n program code and encrypted application SubApp n data, together designated 1250.n, and in effect these are converted into and stored as a data buffer.

Further in FIG. 2, a step 1260 next adds at least one wrapper having a representation of code to call a function and supply an application-specific identification APSID to the called function, to access a storage location for contents, and to call for decryption, of the encrypted sub-application using the contents of the storage location as a key. In some embodiments a plurality of sub-application wrappers are provided corresponding to the encrypted sub-applications respectively. The wrapper code calls for decryption of at least one SubApp n and transfers control to the decrypted code of SubApp n itself. Associated with each sub-application, and provided in or accessible by the wrapper, is an application-specific identification, or APSID 1270 herein. The APSID number or code 1270 identifies and distinguishes by an Application Identification the integrated application or content ESPA from other applications and content, and identifies by a Sub-Application Identification the SubApp n in the application. As a result, a set of integrated sub-applications 1280.n have i) a wrapper for sub-application decryption, ii) encrypted sub-application code, and iii) encrypted sub-application data.

A signature routine 1290 establishes a signing process 1295 such as by HMAC (Hash message authentication code) and signing to produce a deliverable form of ESPA (encrypted with Kcode). The signature routine provides a signature collectively for at least one of the encrypted sub-applications and associated application specific identification and wrapper. The entire ESPA is also suitably signed.

The resulting ESPA is delivered as an information product over a network such as through e-commerce or otherwise. The information product is also suitably delivered physically as an information storage material and physical alterations to the information storage material representing the plurality of encrypted sub-applications, the application-specific identifications and the at least one wrapper, and thus provided as a media product. The thus-integrated application ESPA is delivered to manufacturing 1130 or directly to the ultimate user.

Content is encrypted, for example, according to CPRM (Content Protection for Recordable Media) or other digital rights management. ESPA for CPRM then has a i) a wrapper for CPRM sub-application decryption, ii) encrypted CPRM sub-application code, and iii) encrypted CPRM sub-application data.

Figure 3:
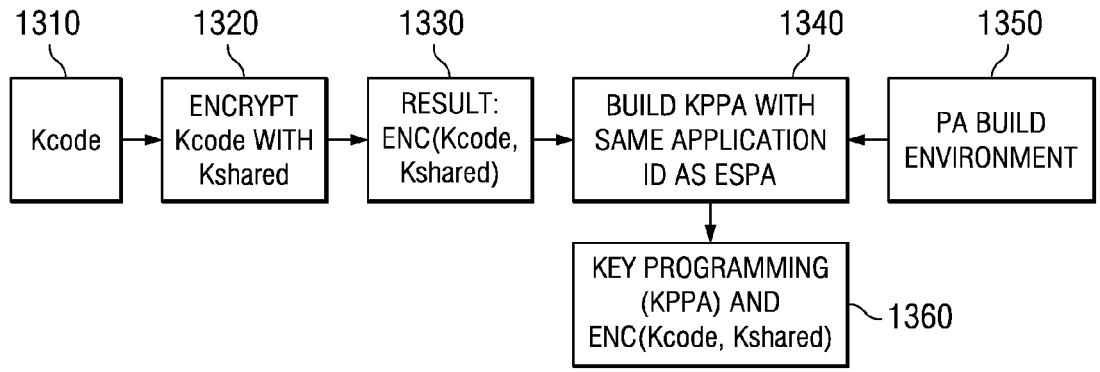
FIG. 3 is a more detailed flow diagram of inventive process steps in making a key programming protected application (KPPA) for inventive process of FIG. 1.

In FIG. 3, a key programming protected application (KPPA) is made by a process which is entirely performed at manufacturing 1130, or at a software development 1110, or at multiple locations and divided up between them. A step 1310 provides symmetric key Kcode. Next, a step 1320 obtains or provides a shared key Kshared and encrypts the symmetric key Kcode with the shared key Kshared. The result 1330 is designated ENC(Kcode, Kshared) and is suitably provided at development process 1110 of FIG. 1.

A succeeding step 1340 builds key programming KPPA with the same Application Identification APID as the integrated application ESPA. In ESPA, the Application Identification APID is part of the application/subapp APSID 1270. Step 1340 is suitably performed at manufacturing 1130, development 1110, or elsewhere. A build environment tool 1350 facilitates the KPPA build. The result 1360 is the encrypted key ENC(Kcode, Kshared) and the key programming KPPA. In some process embodiments, the encrypted key ENC(Kcode, Kshared) and the key programming KPPA are delivered concurrently as in FIG. 3. In other process embodiments, the encrypted key ENC(Kcode, Kshared) is made and delivered, and the key programming KPPA is made elsewhere and delivered separately.

The use of shared key Kshared together with APSID or some portion thereof is conveniently included in a process of generating an application-specific shared key and/or subapp-specific shared key. This embodiment of a key generation process utilizes a cryptographic function or operation symbolized by f1(Kshared, APSID) and produces different shared keys Kshared.APSID where Kshared.APSID=f1(Kshared, APSID).

In words, each SubApp n gets its own shared key Kshared.APSID where APSID has a particular value that pertains to that SubApp n, and APSID can have many values that respectively pertain to the corresponding SubApps.

The shared key Kshared.APSID corresponding to a particular SubApp n is derived by combining the actual Kshared on-chip or delivered to the chip, with the SubApp n APSID. Kshared.APSID represents any one of a set of shared keys derived jointly from shared key Kshared and APSID. In some embodiments, Kshared is used directly. In other embodiments the set of shared keys are generated and assigned each application by using Kshared.APID=f1(Kshared, APID) to create the shared key used to encode Kcode. In still other embodiments a unique shared key Kshared.APSID is created to encode Kcode for each SubApp.

Analogously, a plurality of chip-specific keys Kunique.APSID are suitably formed to respectively bind each SubApp n to the platform. A process embodiment generates different chip-specific keys Kunique.APSID where Kunique.APSID=f2(Kunique, APSID). In words, in the platform, each SubApp n gets its own chip-specific key Kunique.APSID where APSID has a particular value that pertains to that SubApp n, and APSID can have many values that respectively pertain to all the SubApps. Function f2 is some particular cryptographic function selected for the process of respectively binding SubApps and keys related to Kcode to the platform.

Accordingly, different alternative embodiments create the encrypted forms ENC(Kcode, Kshared), ENC(Kcode, Kshared.APID), or ENC(Kcode, Kshared.APSID). A set of shared keys Kshared.APID are thus specific to different applications in some embodiments. A set of shared keys Kshared.APSID are specific to different applications and SubApps in those applications in other embodiments.

Function f1, f2, etc., is some particular cryptographic function selected for the purpose. In some embodiments, the cryptographic function is non-invertible or non-reversible. The shared key Kshared.APSID communicates Kcode to the platform according to a just-listed encrypted form.

To recover Kcode, the KPPA process generates Kshared.APSID from on-chip Kshared using a SubApp-specific value of APSID. Then using Kshared.APSID, the encrypted form ENC(Kcode, Kshared.APSID) is decrypted using the shared key Kshared.APSID to recover Kcode. Kcode is then re-encrypted using Kunique.APSID to provide a device-bound key for the particular SubApplications. Analogous description of process embodiments at the application-level are provided by substituting APID for APSID in the description above.

In still other embodiments, Kcode at development time is made into a set of keys Kcode.APSID=f3(Kcode, APSID), where f3 is some cryptographic function. Each SubApp is encrypted in the development process using its assigned key Kcode.APSID to produce an encrypted SubApp (Kcode.APSID). The keys Kcode.APSID are then encrypted to produce a set of encrypted forms ENC(Kcode.APSID, Kshared.APSID). In manufacture, a key programming KPPA binds the encrypted forms to the platform by re-encryption to produce a set of device-bound encrypted forms ENC (Kcode.APSID, Kunique.APSID).

At run-time for a given SubApp, the device-bound encrypted form for that SubApp is decrypted by a key retrieval KRPA to recover the SubApp-specific key Kcode.APSID that was originally used to encrypt the SubApp at development time and was delivered to the platform. The SubApp(Kcode.APSID) on the platform is decrypted at run-time using the now-recovered SubApp-specific key Kcode.APSID to recover and execute the SubApp itself in Secure Mode. (APID is substituted for APSID for corresponding application-level key process embodiments.)

A process flow summarizing FIG. 1 is represented by $$Kcode.A1 \rightarrow ENC(Kcode.A1, Kshared.A2) \rightarrow ENC(Kcode.A1, Kunique.A3) \quad (1)$$

Suffixes .A1, .A2, .A3 represent independently applicable key generation operations.

Note that the term "suffix" represents whether and how a base key (Kcode, Kshared, or Kunique) is multiplied into derivatives herein based on a cryptographic function of the base key and APID or APSID, if any. The term suffix does not indicate that the key itself literally is extended with any bits unless such extension is the result of a particular cryptographic function used. For conciseness in most of the description herein, the suffixes are omitted, it being understood that any tabulated suffixing representing key derivatives is provided to accommodate the needs of any particular implementation.

TABLE 1 shows some information pertaining to eight (8) of the embodiments when keys are established at the application level. A null entry in the table means that a single value of the key is used instead of any .APID derivative key. In the process flow (1) hereinabove, any tabulated suffix value for A1 can be mixed with any tabulated suffix value for A2, which can be mixed with any tabulated suffix value for A3. Accordingly, two column entries in each of three columns represents 2×2×2=8 embodiments.

TABLE 1

SUFFIXES OF KEYS AT APPLICATION LEVEL ONLY

| Kcode.A1 | Kshared.A2 | Kunique.A3 |
|---|---|---|
| Null | Null | Null |
| .APID | .APID | .APID |

TABLE 2 shows some information pertaining to twenty seven (27) of the embodiments when keys are established at the sub-application SubApp level. A null entry in the table means that a single value of the key is used without any .APID or .APSID suffix. In respective embodiments, any tabulated suffix value for A1 can be mixed with any tabulated suffix value for A2, which can be mixed with any tabulated suffix value for A3. Accordingly, three column entries in each of three columns represents 3×3×3=27 embodiments.

TABLE 2

SUFFIXES OF KEYS AT SUB-APPLICATION LEVEL

| Kcode.A1 | Kshared.A2 | Kunique.A3 |
|---|---|---|
| Null | Null | Null |
| .APID | .APID | .APID |
| .APSID | .APSID | .APSID |

Choice of embodiment involves various tradeoffs of key storage, key processing complexity, degree of security, convenience in manufacturing or e-commerce, and other considerations. Even when the key values differ depending on the APID or APSID, the amount of encryption and decryption of the ESPA and its SubApps is believed to be relatively little increased. All of the embodiments are believed to offer various respective desirable features for particular systems to which their particular advantages commend them.

In the meantime, the chip making process 1120 of FIG. 1 is generating a series of Chip-Specific key values of key Kunique and fabricating processor chips in volume. The processor chips have a processor core, a secure RAM, an EPROM, and may have one or more hardware accelerators (HWA) for decryption and encryption. Process 1120 manufactures or programs the Chip-Specific keys Kunique, and in some cases shared key Kshared as well, in a non-volatile manner into the processor chips respectively. The processor chips thus programmed with values of key Kunique are delivered to manufacturing process 1130. The key Kunique is stored on-chip and is not accessible from outside the chip in some high-security embodiments.

Figure 4:
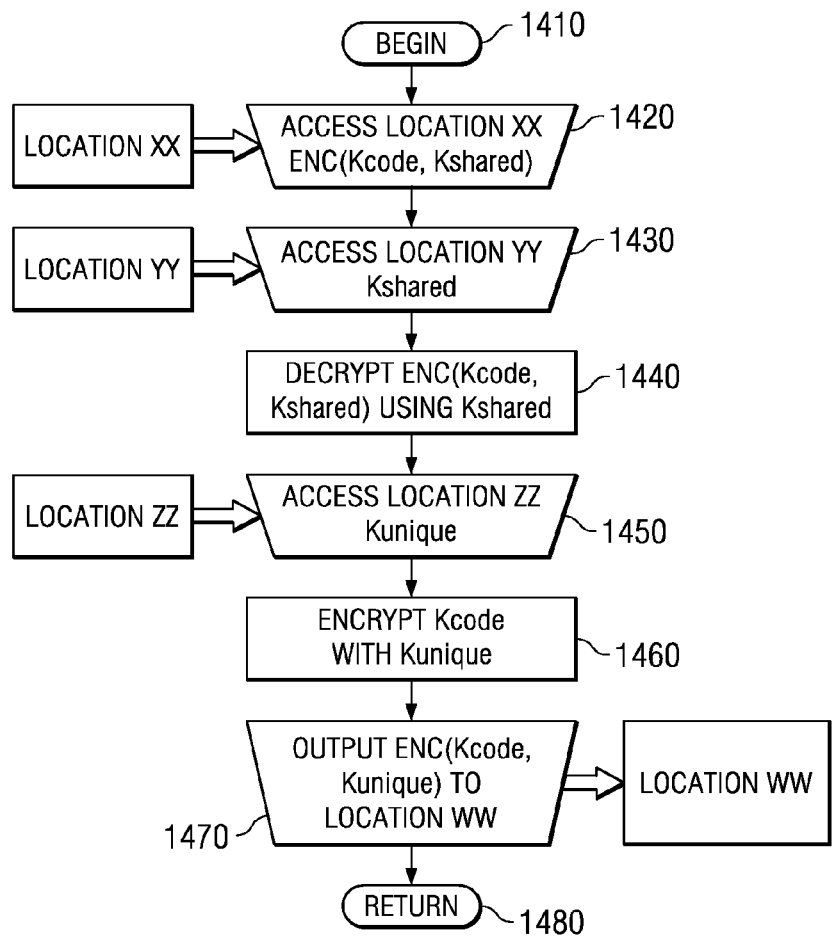
FIG. 4 is a flow diagram of an inventive process of operation and data structure for the KPPA of FIG. 3.

In FIG. 4, an example of KPPA from FIG. 3 step 1340 is a set of instructions or coded representations that establish processor operations in the handset in manufacturing 1130. The representations and operations commence with a BEGIN 1410, and an access 1420 directed to a predetermined location XX where the encrypted key ENC(Kcode, Kshared) is to be found. An analogous access 1430 directs retrieval of shared key Kshared from a predetermined location YY. Further, a decryption call 1440 specifies decryption of the contents ENC(Kcode, Kshared) of location XX using the contents Kshared of location YY, to recover key Kcode. A succeeding access 1450 directs retrieval of chip-specific value of key Kunique from a predetermined location ZZ. Locations can be predetermined, for instance, either directly by specifying a physical location or indirectly by pointing to a vector. An encryption call 1460 specifies encryption of the recovered Kcode by the contents Kunique obtained from location ZZ, and delivers an encrypted form ENC(Kcode, Kunique). An output representation 1470 directs a load of the encrypted form ENC(Kcode, Kunique) to a predetermined location WW, whence a RETURN 1480 is reached.

When a Kshared.APID embodiment of TABLE 1 is used, then FIG. 4 step 1430 retrieves base key Kshared from location YY and then calls or applies the cryptographic function f1 to generate Kshared.APID=f1 (Kshared, APID) using the retrieved base key Kshared, and the Application Identification APID.

When a Kunique.APID embodiment of TABLE 1 is used, then FIG. 4 step 1460 retrieves base key Kunique from location ZZ and then calls or applies the cryptographic function f2 to generate Kunique.APID=f2(Kunique, APID) using the retrieved base key Kunique, and the Application Identification APID. Then step 1460 encrypts Kcode with Kunique.APID. Analogous description applies to some Sub-App embodiments where .APSID is used in these steps 1430 and/or 1460.

Figure 5:
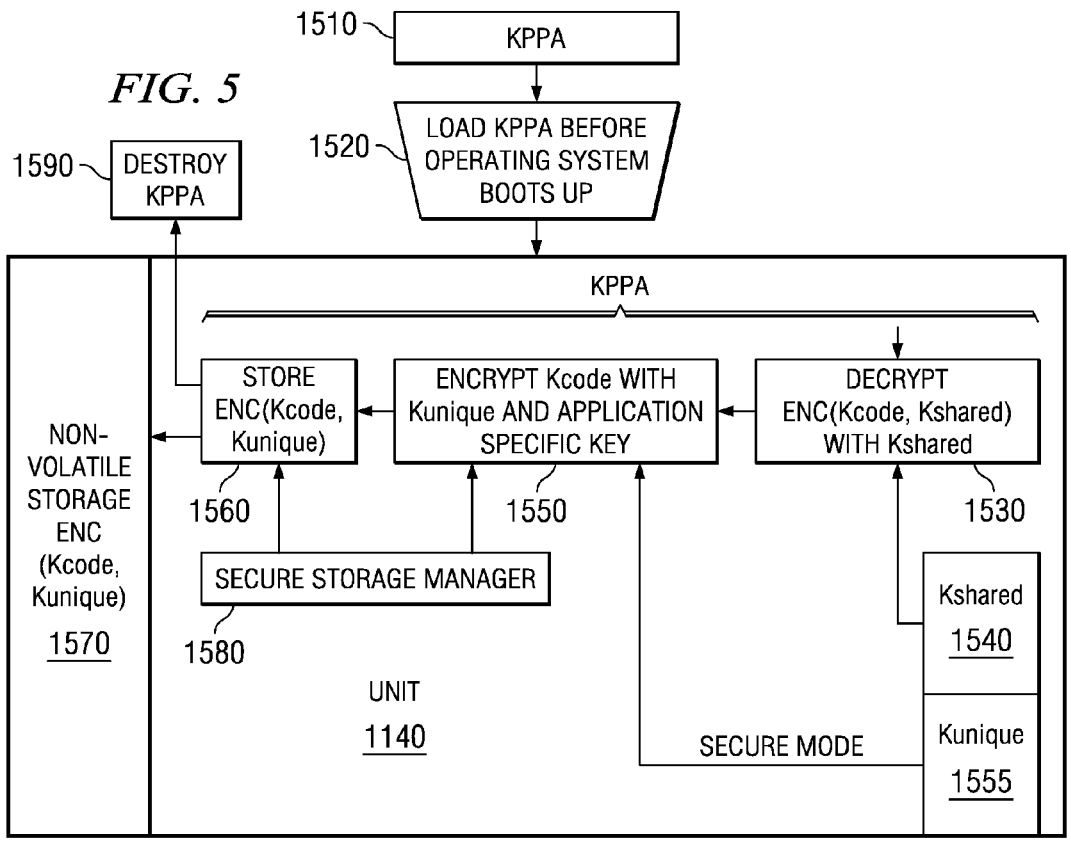
FIG. 5 is a more detailed flow diagram of inventive process steps in the manufacture of production units in the process of FIG. 1.
Figure 6A:
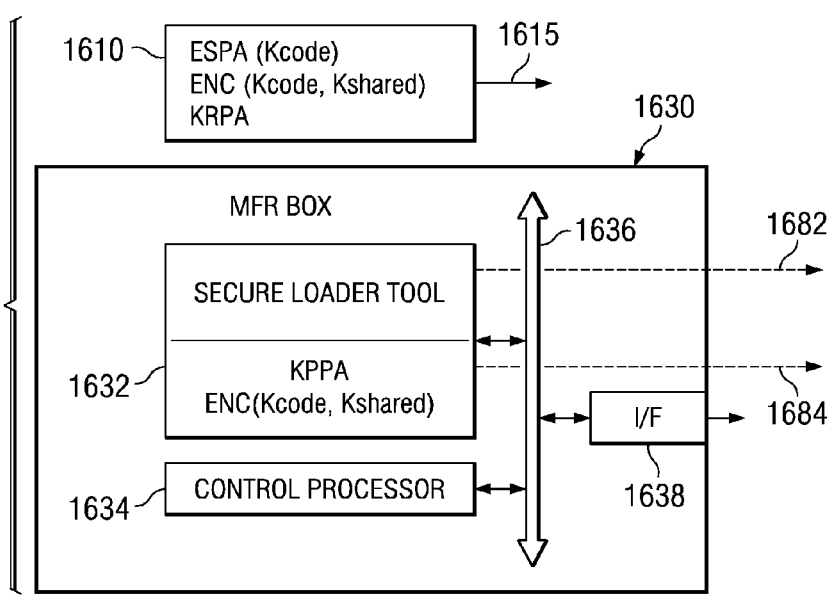
FIGS. 6A and 6B are two parts of a composite block diagram of inventive structures and inventive processes both for manufacture of production units in the process of FIG. 1 and for distribution over wireless or internet of information product software and content to user devices.
Figure 6B:
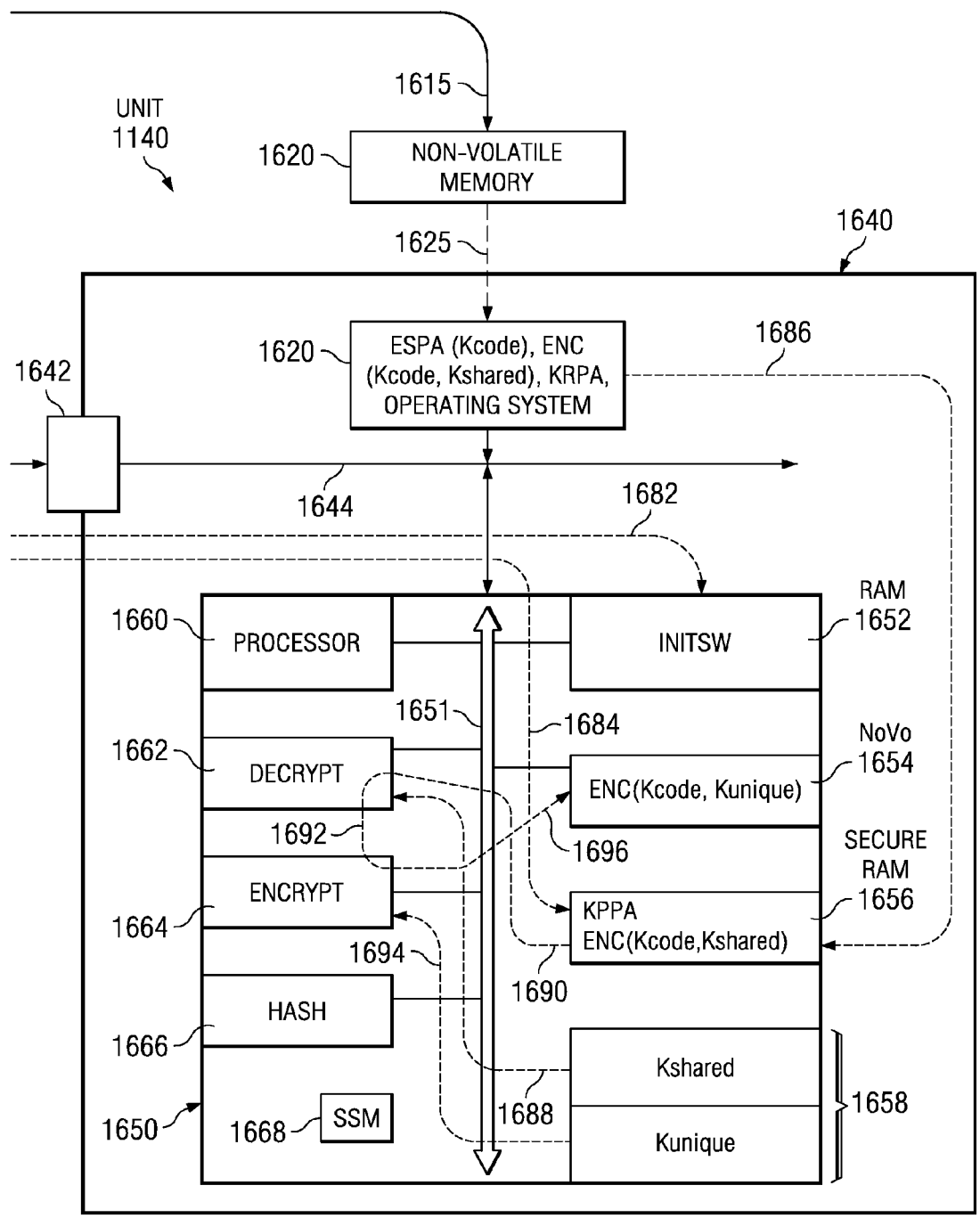

In FIGS. 5, 6A and 6B, manufacturing process 1130 obtains the signed, encrypted ESPA from process 1110 of FIG. 1 and step 1295 of FIG. 2. The process makes or programs non-volatile memory chips in volume to store a copy of each of operating system OS, ESPA, ENC(Kcode, Kshared), and a key retrieval KRPA into the non-volatile memory chips. In FIGS. 6A/6B, a flash programmer unit 1610 suitably programs each copy via a line or bus 1615 into a specific location in a programmable flash memory 1620, for instance.

The process 1130 obtains the processor chip with chip-specific key Kunique from chip manufacturing 1120, and assembles handset PC board 1640 with non-volatile memory chip 1620 and a processor/hardware accelerator (HWA) chip 1650. In a step 1510 of FIG. 5, the process obtains or provides key programming KPPA from step 1340 into manufacturing box 1630 of FIG. 6A.

A step 1520 of FIG. 5 loads key programming KPPA into on-chip Secure RAM (volatile) before the cell phone operating system OS boots up. The key programming KPPA has the encrypted form ENC (Kcode, Kshared) from memory storage 1632 of FIG. 6A or alternatively the encrypted form is stored in Flash 1620 and KPPA accesses the encrypted form from Flash 1620. Key injection at initial programming is occurring at this point.

In the injection process, a step 1530 decrypts the encrypted form ENC(Kcode, Kshared) with the shared key Kshared stored in location 1540, to recover Kcode itself. This decryption is executed in Secure Mode inside the processor/HWA chip 1650 in unit 1140. This enhances protection on the manufacturing floor and in e-commerce by user.

In Secure Mode, a step 1550 further executes key programming KPPA to call for encryption of key Kcode with a chip-specific value of key Kunique from location 1555. A further step 1560 stores the thus re-encrypted form ENC(Kcode, Kunique) into non-volatile storage 1570. Non-volatile storage 1570 is provided as programmable non-volatile on-chip EPROM 1654 of the processor chip itself or other non-volatile storage 1620 of the product unit. A secure storage manager 1580 provides encryption and storage operations in secure mode to support KPPA in steps 1550 and 1560. The re-encryption directly binds Kcode to the platform and indirectly binds the encrypted application ESPA (Kcode) to the platform too.

A further security step suitably disables the programmability of the non-volatile memory space where key retrieval KRPA code and encrypted form ENC(Kcode, Kunique) are stored, or configures the hardware secure state machine to protect these spaces from being unauthorizedly written in the future. KPPA and/or KRPA in some embodiments is stored with encryption and in other embodiments is stored without encryption. Even when stored without encryption, KPPA and KRPA are only operable in secure mode, and the location addresses that KPPA accesses are only accessible in secure mode.

An erase step 1590 destroys or erases KPPA from Secure RAM 1656 by overwriting the key programming KPPA and overwriting the key Kcode if Kcode is present in Secure RAM. Secure RAM 1656, which is volatile, is also or alternatively powered down to lose the information therein. Key programming KPPA and Kcode are now obliterated and absent from the handset unit.

In FIG. 6A, box 1630 has a memory 1632 with a secure loader tool, and space for key programming KPPA and, in some process embodiments, the encrypted form ENC(Kcode, Kshared). A control processor 1634, bus 1636, and interface I/F 1638 are coupled to each other and the memory 1632. Interface I/F 1638 delivers, loads or downloads information to one or more units 1640 of FIG. 6B.

In FIG. 6A, I/F 1638 in some embodiments is adapted for rapid electrical contact coupling, uncoupling, and recoupling to successive production units 1640 on a production line. Box 1630 operates as a manufacturing box. In some other embodiments interface I/F 1638 is a capacitive, inductive, or short distance wireless link for non-contact coupling to successive production units 1640 on a production line.

In still other embodiments interface I/F 1638 is a wireless or wireline network link from the box 1630 as a remote information product distribution box such as for obtaining content and software from Internet, DSL, fiber optics (FDDI), cable, cellular, WiMax, WLAN, and other networks. The box 1630 suitably is provided to have a library of information products and encrypted codes ENC(Kcode, Kshared) for them.

For instance, the user can arrange to have a subscription that downloads a subset of the codes with a KPPA, or single commercial transaction that downloads one code and a KPPA. KPPA binds each Kcode to the device by re-encryption, and then the encrypted codes ENC (Kcode, Kshared) are obliterated and KPPA is obliterated. A particular piece of software or content ESPA(Kcode), with which the KPPA is associated, is also downloaded. The download goes to non-volatile storage such as flash or hard drive in the handset or media player on demand concurrently or later under the subscription or under a single commercial transaction. In this way ESPA (Kcode) is useful only to an authorized user. Since ENC (Kcode, Kshared) and KPPA are absent, an attempt to transfer ESPA (Kcode) by itself to an unauthorized user is futile. ENC (Kcode, Kunique) directly binds Kcode to the platform so ESPA(Kcode) is thus indirectly bound to the platform as well.

In FIGS. 6A/6B, during each coupling operation (or download) there is a short interval wherein the control processor 1634 uses the secure loader tool in memory 1632 to deliver initializing software INITSW and KPPA to a non-secure RAM 1652, see arrow 1682. Then processor 1660 on-chip runs initializing software INITSW to load Secure RAM 1656 with KPPA from non-secure RAM 1652, completing the path of KPPA, see arrow 1684. INITSW further loads Secure RAM 1656 with encrypted form ENC (Kcode, Kshared) via arrow 1684 from memory 1632 of FIG. 6A or via arrow 1686 from non-volatile memory 1620 of FIG. 6B.

In FIG. 6B, with chip 1650 still powered up, processor 1660 executes KPPA in secure mode from Secure RAM 1656. The processor 1660 executes KPPA so that Kshared is retrieved from non-volatile store 1658 per arrow 1688 for use by decrypt HWA 1662. Processor 1660 runs KPPA so that the series of arrows 1690, 1692, 1696 deliver a re-encrypted form ENC(Kcode, Kunique) to on-chip non-volatile memory NoVo 1654. Arrow 1690 represents delivery of first encrypted form ENC(Kcode, Kshared) to decrypt HWA 1662. Arrow 1692 delivers the recovered Kcode from decrypt HWA 1662 to encrypt HWA 1664. Key Kunique is retrieved per arrow 1694 from secure non-volatile storage 1658 for use by encrypt HWA 1664. Arrow 1696 shows delivery of encrypt HWA output to NoVo 1654 as ENC(Kcode, Kunique). Then chip 1650 is powered down and INITSW, KPPA, and ENC (Kcode, Kshared) vanish from chip 1650.

NoVo 1654 is any suitable writable non-volatile storage such as electrically erasable programmable read-only memory (EEPROM), erasable programmable read only memory (EPROM), non-volatile random access memory (NVRAM), programmable read only memory (PROM), battery-backup random access memory (BBRAM), magnetic storage devices such as small form factor hard disk drive (HDD), and other non-volatile technology now known or yet to be devised.

Figure 8:
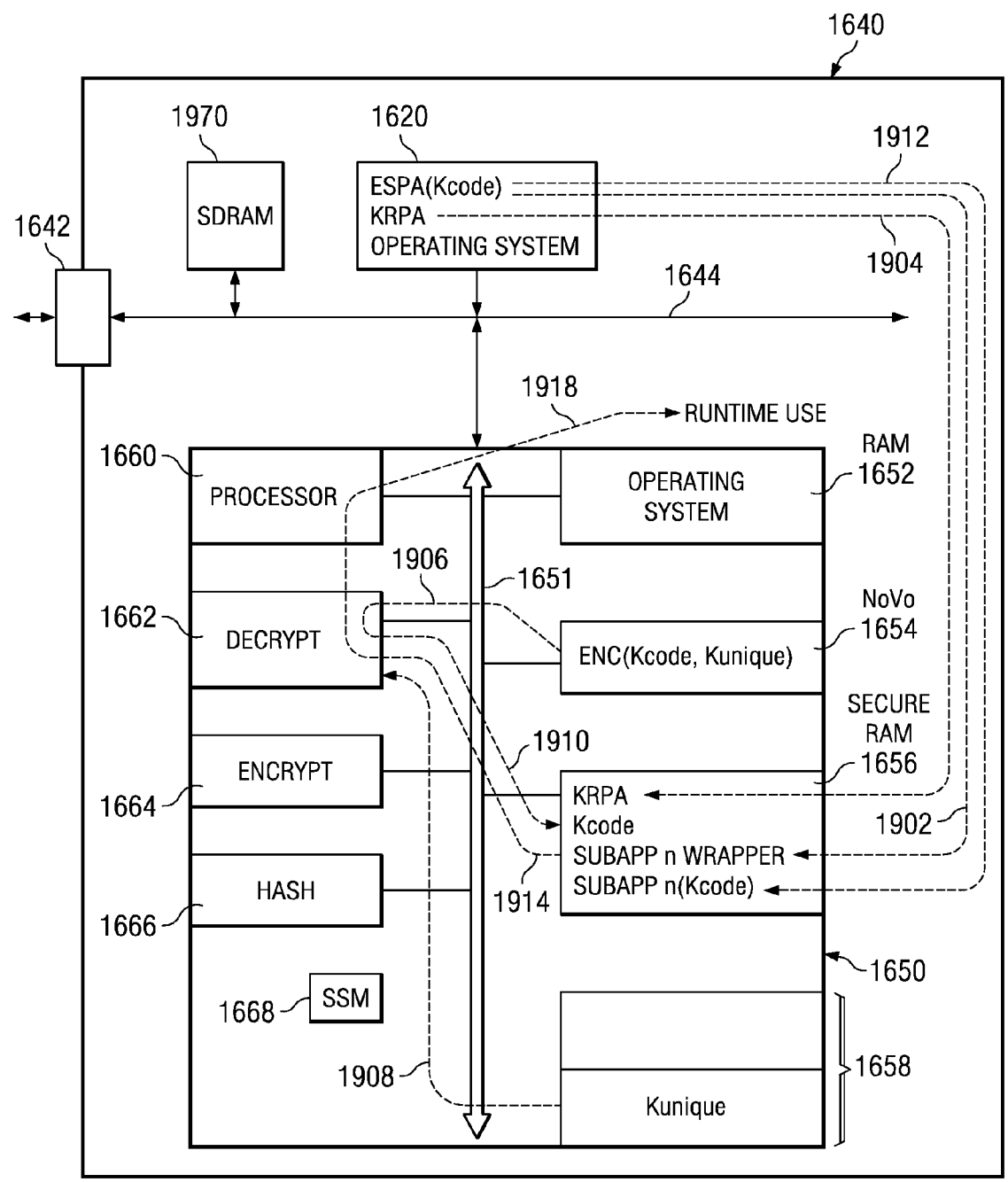
FIG. 8 is a block diagram of an inventive production unit of FIG. 1 with arrows showing an inventive run-time process of control and signal processing superimposed on the structural blocks of the unit.

In FIGS. 7 and 8, a wrapper-based decryption process performs run-time execution of the integrated application software in the handset 1140. Run-time can occur in manufacturing test, and run-time is later frequently performed by the ultimate handset user.

Signature authentication is performed. At this point, an integrated application corresponding to that of step 1280 or 1295 of FIG. 2 includes encrypted sub-applications SubApp n and respective SubApp wrappers in non-volatile memory 1620 of the handset 1140. An application or SubApp wrapper herein is a wrapper with wrapper code that calls for decryption of an application. An application has an encrypted application code and/or data and/or content or encrypted sub-application code and/or data and/or content. For example, ESPA has a set of sub-application wrappers and corresponding encrypted sub-applications SubApp n encrypted using the key Kcode. Each sub-application wrapper calls for decryption of that ESPA encrypted sub-application SubApp n and passes or transfers control to the decrypted code of SubApp n itself.

Further in FIG. 7, a step 1810 makes an API (application peripheral interface) call to ESPA. In the handset in Secure Mode, a succeeding step 1820 loads from the integrated application in memory 1620 a sub-application SubApp n (if not already loaded). Load step 1820 loads sub-application SubApp n with relevant parameters from flash memory 1620 of FIG. 8 to Secure RAM 1656 in Secure Mode in the processor chip 1650. Hash 1666 is used to authenticate the signature if not yet authenticated. At this point, the on-chip Secure RAM 1656 now holds i) a wrapper for sub-application decryption, ii) encrypted sub-application code, and iii) encrypted sub-application data for SubApp n, all as provided in Step 1280 of FIG. 1.

A step 1830 operates in Secure Mode and executes key retrieval KRPA to read the re-encrypted form ENC(Kcode, Kunique) of step 1560 of FIG. 5 from non-volatile on-chip storage 1570 (1654 of FIGS. 7-8). This operation occurs, provided that a decryption counter or flag bit CTR for the purpose equals a predetermined number such as zero. The use of the decryption counter or flag bit CTR prevents repeated decryption.

Decryption counter or flag CTR is maintained in a hardware-protected secure environment. Step 1830 further operates in Secure Mode to recover Kcode itself by decrypting re-encrypted form ENC(Kcode, Kunique) with the chip-specific value of key Kunique from non-volatile storage 1658, provided the decryption counter equals the predetermined number such as zero. Now Kcode itself is delivered to Secure RAM 1656.

Further in FIG. 7, a step 1840 operates in Secure Mode in response to a call from key retrieval KRPA to decrypt the integrated application code and data for SubApp n with the now-recovered key Kcode if the decryption counter equals the predetermined number such as zero. In a step 1850, the decrypted SubApp n code/data is stored to Secure RAM 1656. A step 1860 in Secure Mode sets the decryption counter or flag CTR to a different number (such as 1) other than the predetermined number (such as 0) above, to prevent inadvertent repeated decryption. A step 1870 in Secure Mode passes Parameters from an Application Loader to the application code (SubApp n code) to make the appropriate API call and execute the Sub App n code, with resulting Performance of the application and/or of media content.

In FIG. 8, run-time process steps are highlighted by arrows that generally correspond to the steps of FIG. 7. Operating System OS has already been delivered, at least in part, to RAM 1652. Arrows 1902 and 1904 show SubApp n Wrapper and key retrieval KRPA respectively delivered to Secure RAM 1656. KRPA commences executing and accesses per arrow 1906 encrypted form ENC(Kcode, Kunique) for decrypt HWA 1662. KRPA calls HWA 1662, and arrow 1908 shows Kunique used by decrypt HWA 1662 to decrypt and recover Kcode into Secure RAM 1656 via arrow 1910.

Now SubApp n Wrapper is executed by processor core 1660 to retrieve via arrow 1912 the encrypted SubApp n code/data to Secure RAM 1656. Per arrow 1914 SubApp n Wrapper applies encrypted SubApp n code/data to decrypt HWA 1662 and decrypts with Kcode. The result is performance in Runtime Use along buses 1651 and 1644 per arrow 1918.

The runtime steps are also suitably performed for more SubApps in the same application, and with reference to a secure counter CTR to avoid repeating the key decryption of Kcode. Secure demand paging is provided in some embodiments and uses SDRAM 1970 herein as an extended secure RAM for various applications ESPA(Kcode) and sub-applications. See for background the hereby-incorporated TI-38213 "Methods, Apparatus, and Systems for Secure Demand Paging and Other Paging Operations for Processor Devices" U.S. Ser. No. 11/426,597 filed Jun. 27, 2006. When the application completes, key Kcode and SubApps and their SubApp wrappers for that application are erased and CTR is reset. Also, when power is turned off, the contents of the volatile memories on-chip RAM 1652 and Secure RAM 1656, and of SDRAM 1970 are obliterated.

Figure 9:
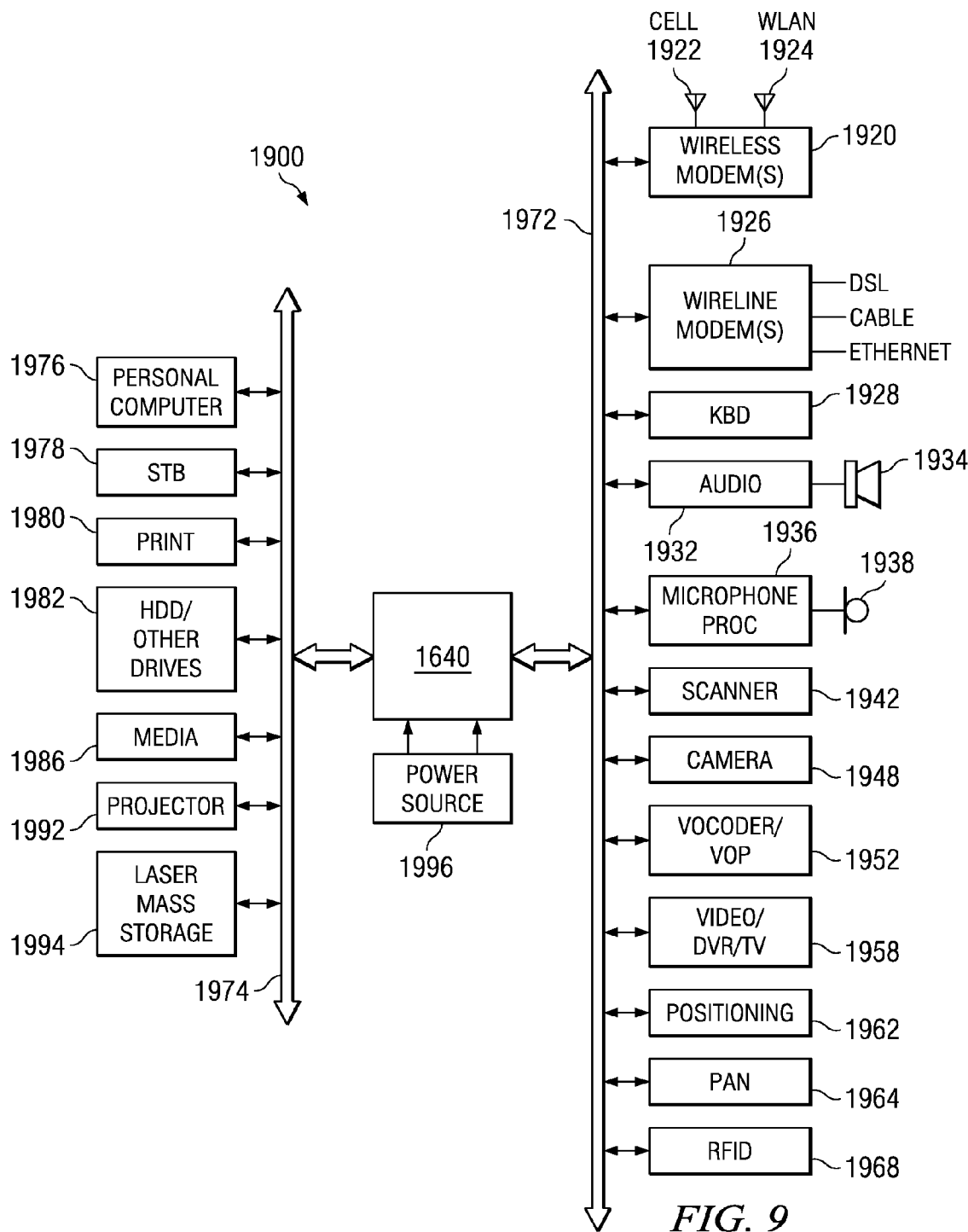
FIG. 9 is a block diagram of an inventive system made according to the inventive process of FIG. 1.

In FIG. 9, various product units 1140 of FIG. 1, such as handsets or other units whether mobile or not, have FIG. 8 printed circuit board 1640 including or coupled to one, some or all of illustrated peripherals. Software, content and device-bound codes are delivered to the various product units at manufacturing time or by downloading on demand as described elsewhere herein.

The user can arrange to have a subscription that downloads a set of codes of the form ENC (Kcode, Kshared) with a KPPA, or single commercial transaction that downloads one code and a KPPA. KPPA binds each Kcode to the device in the form ENC (Kcode, Kunique). Then the encrypted codes ENC (Kcode, Kshared) are obliterated and KPPA is obliterated as in FIG. 5. A particular piece of software or content ESPA (Kcode) with which the KPPA is associated also is downloaded. The ESPA (Kcode) download goes to non-volatile storage such as flash or hard drive in the handset or media player on demand concurrently or later under the subscription or per a single commercial transaction. In this way ESPA (Kcode) is useful only to an authorized user. Because ENC (Kcode, Kshared) and KPPA are absent, an attempt to transfer ESPA (Kcode) by itself to an unauthorized user is futile.

The embodiments, applications and system blocks disclosed herein are suitably implemented in fixed, portable, mobile, automotive, seaborne, and airborne, communications, control, set top box, and other apparatus. The personal computer (PC) is suitably implemented in any form factor such as desktop, laptop, palmtop, organizer, mobile phone handset, PDA personal digital assistant, internet appliance, wearable computer, personal area network, or other type. In this way product units are provided for cellular telephones, radios and televisions, fixed and portable entertainment units, routers, pagers, personal digital assistants (PDA), organizers, scanners, faxes, copiers, household appliances, office appliances, combinations thereof, and other application products now known or hereafter devised in which there is desired increased, partitioned or selectively determinable advantages next described.

In this way, advanced networking capability for services, software, and content, such as cellular telephony and data, audio, music, voice, video, e-mail, gaming, security, e-commerce, file transfer and other data services, internet, world wide web browsing, TCP/IP (transmission control protocol/Internet protocol), voice over packet and voice over Internet protocol (VoP/VoIP), and other protocols and services accommodates and provides security for secure utilization and entertainment appropriate to the just-listed and other particular applications, while recognizing market demand for different levels of security.

In FIGS. 8 and 9, one embodiment of a printed wiring board 1640 suitably includes an applications processing section with a RISC processor or other suitable processor, a digital signal processor (DSP), and a memory controller with DMA (direct memory access), and a 2D (two-dimensional display) graphic accelerator.

The RISC processor and the DSP have access via an on-chip extended memory interface (EMIF/CF) to off-chip memory resources including volatile memory 1970 such as mobile DDR (double data rate) DRAM, SDRAM (synchronous DRAM) and other DRAM (dynamic random access memory). Non-volatile memory 1620 suitably includes flash memory such as NAND Flash, NOR Flash, and Compact Flash, flash drive, and off-chip ROM.

In FIG. 9, the printed wiring board 1640 is coupled via bus 1972 to one or more wireless modems 1920 such as cellular modem with one or more cellular antennas 1922 and WLAN (wireless local area network, IEEE 802.11a/b/g and successors) modem and antenna(s) 1924. The modems 1920 deliver any one or more of GSM, GPRS, EDGE, UMTS or WCDMA, and OFDMA/MIMO (Global System for Mobile communications, General Packet Radio Service, Enhanced Data Rates for Global Evolution, Universal Mobile Telecommunications System, Orthogonal Frequency Division Multiple Access and Multiple Input Multiple Output Antennas) wireless, and may suitably have high speed digital data service. Also the modem(s) 1920 suitably include a codec for CDMA (Code Division Multiple Access), CDMA2000, wireless with or without an HSDPA/HSUPA (High Speed Downlink Packet Access, High Speed Uplink Packet Access) (or 1xEV-DV, 1xEV-DO or 3xEV-DV) data feature.

Security circuitry and HWAs support any one or more of various encryption/decryption processes such as WEP (Wired Equivalent Privacy), RC4, TKIP, CKIP, WPA, AES (advanced encryption standard), 802.11i and others. The WLAN modem suitably includes an embedded processor and a MAC (media access controller), PHY (physical layer) and AFE (analog front end) for use in various WLAN and UMA (Unlicensed Mobile Access) modem applications. Still other additional wireless interfaces such as for wideband wireless such as IEEE 802.16 "WiMAX" mesh networking and other standards are suitably provided and coupled to the applications processor and other processors on printed circuit board 1640.

Wireline modem(s) 1926 support DSL (digital subscriber line broadband over twisted pair copper infrastructure), cable (DOCSIS and other forms of coaxial cable broadband communications), premises power wiring, fiber (fiber optic cable to premises), and Ethernet wideband network.

A keyboard or keypad or other tactile user device 1928 provides manual data input and commands to the system. An audio block 1932 has audio I/O (input/output) circuits to speaker(s) 1934, a speech processor 1936, microphone 1938 and headphones (not shown). Audio blocks 1936, 1932 respectively have a voice codec and a stereo DAC (digital to analog converter), which in turn have a signal path coupled to the printed circuit board 1640 with suitable encryption/decryption activated or not. Internet audio/video device functionality and other content-based services are suitably supported.

Video and audio user input/output are provided by a scanner 1942, camera(s) 1948 for still camera and motion video camera, codec(s) 1952 for voice over packet and video over packet, and video peripherals 1958 such as for transcoding digital video recorder (DVR) and television. Tactile and video input are suitably combined in a touch screen and interface.

Printed circuit board 1640 is associated with position/location-determining circuitry 1962 for satellite-based positioning such as GPS (Global Positioning System) and for cell-based positioning. Printed circuit board 1640 is also coupled to a USIM (UMTS Subscriber Identity Module) or other SIM for user insertion of an identifying plastic card, or other storage element, or for sensing biometric information to identify the user and activate features. A PAN (personal area network) interface 1964 provides biomedical input/output, short distance wireless and various data/audio/video services. A UART data interface and MCSI (Multi-Channel Serial Interface) voice wireless interface, for example, support IEEE 802.15 ("Bluetooth" and high and low rate piconet and personal network communications wireless circuit in PAN 1964. A JTAG emulation interface couples to an off-chip emulator Debugger for test and debug. Additionally, one or more serial ports and UART/IrDA (infrared data) interface couple to off-chip Host and Client devices. RFID (radio frequency identification) for transponding and communication of data with RFID transponder(s) for medical, business and personal purposes is provided by interface 1968.

Reception of software, and intercommunication and updating of information are provided between a personal computer 1976 and printed circuit board 1640. Such intercommunication and updating also occur automatically and/or on request via WLAN, Bluetooth, or other wireless circuitry. A video/audio/data interface 1978 is suitably provided by a set top box circuit such as for a satellite antenna or cable system. A printer 1980 provides hard copy output of text, graphics, and photograph-quality images. Drives 1982 suitably include a hard disk drive, detachable flash drive, memory card drive and floppy disk drive. Media block 1986 provides a read/write CD (compact optical disk) interface. A projector 1992 provides interface and image display. Laser mass storage 1994 provides optical storage of large amounts of data put at the ready for use by product unit 1900.

A power source and power conversion block 1996 for mobile use include power management circuitry coupled to a battery pack with batteries and backup battery to provide power to the system. Battery data are provided from the battery pack. When needed, the battery also receives charging current from a battery charge controller and power supply receiving power from premises power wiring.

Figure 10:
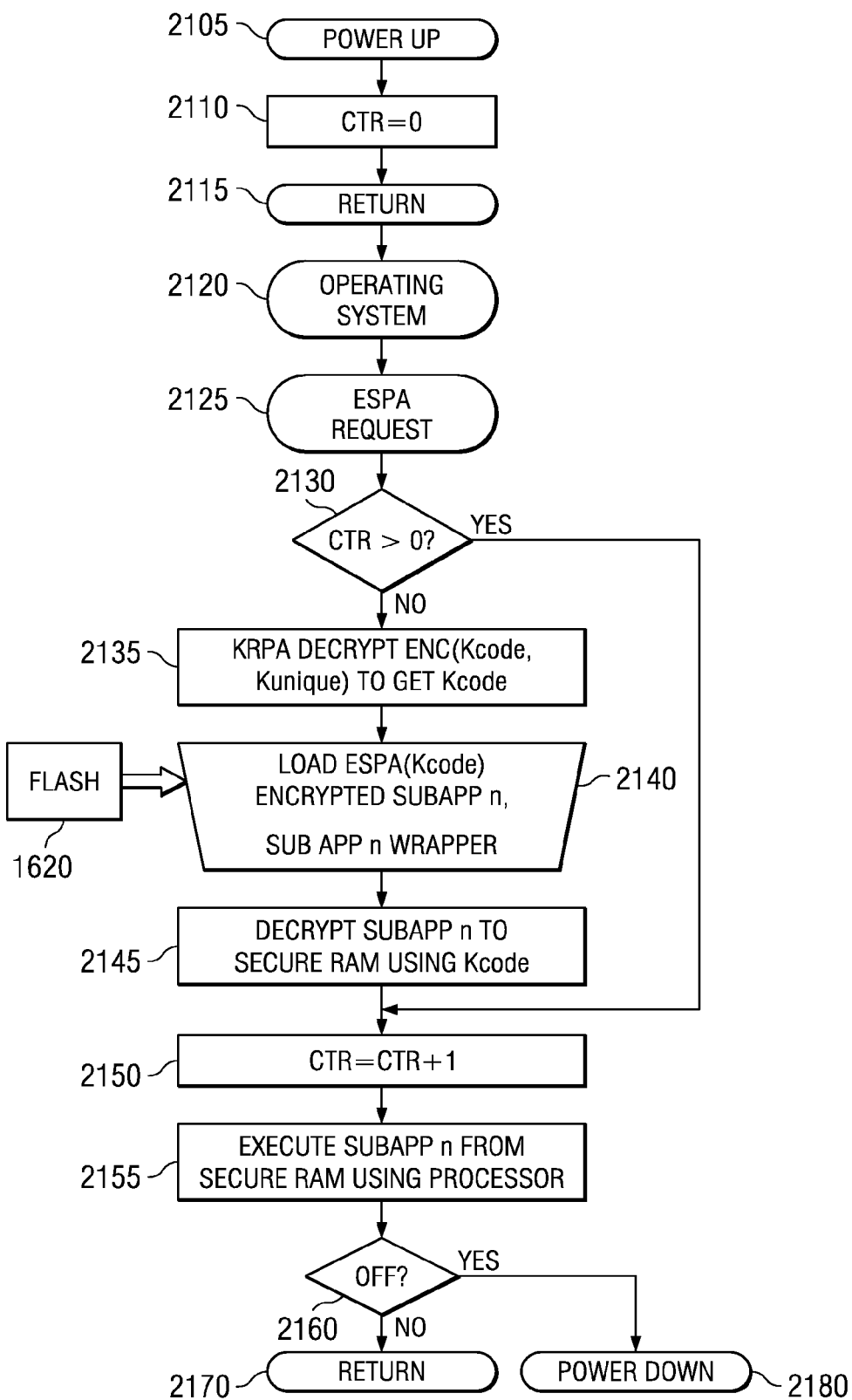
FIG. 10 is a flow diagram of an inventive run-time process of control, cryptographic operations, and signal processing.

In FIG. 10, another embodiment of runtime information processing commences operations with a Power Up event 2105 and proceeds to a step 2110 that sets a secure counter or secure flag CTR to a predetermined value (e.g., zero, 0) to indicate that a specific sub-application SubApp n in an identified application is not currently decrypted. In some embodiments, multiple applications are processed in a sequential or overlapping or concurrent manner. The APSID is used or mapped, for example, to establish the assignment for each sub-application and to distinguish between different applications. Accordingly, different sub-applications and their applications are assigned respective CTR.APSID bits, and one or more CTR registers hold the CTR.APSID bits for the respective sub-applications. For simplicity of description the designation CTR is used to describe the handling of one particular sub-application SubApp n.

After step 2110 and other suitable power-up initialization, operations reach a RETURN 2115 and subsequent operations of an Operating System OS 2120. OS 2120 in due course makes a request 2125 for the SubApp n in particular protected application ESPA(Kcode) that resides in flash memory 1620.

A step 2130 checks to determine whether the CTR bit for SubApp n is greater than zero. If the CTR bit were greater than zero, that would indicate that SubApp n is already decrypted. On the first request for SubApp n after power up, this CTR bit is zero (No at step 2130) and operations proceed to a step 2135 to execute key retrieval KRPA. Step 2135 decrypts the encrypted form ENC(Kcode, Kunique) to recover Kcode itself. Note that .APSID and/or RAPID keys are suitably used in step 2135 in connection with Kcode and Kunique in some embodiments as discussed earlier hereinabove. A succeeding step 2140 loads SubApp n code/data and SubApp n Wrapper 1280 of FIG. 2 from integrated application ESPA(Kcode) that resides in Flash memory 1620 and authenticates the signature. SubApp n has been stored in memory 1620 in an encrypted form encrypted with Kcode.

The SubApp n Wrapper is executed in a step 2145 to decrypt SubApp n code/data using Kcode (or Kcode.APID or Kcode.APSID) from step 2135 and store the decrypted SubApp n code/data in Secure RAM 1656. Then a step 2150 increments secure counter CTR or simply sets CTR as a secure flag to one, depending on embodiment. The processor 1660 in a further step 2155 then executes SubApp n from Secure RAM 1656 to deliver run-time performance and content. A step 2160 checks whether the system is being turned OFF. If YES, then operations go to Power Down 2180, otherwise to RETURN 2170.

If not turned off at step 2160, operations go via the RETURN 2170 and back to OS 2120. Other SubApps may be called and their CTR bits become set also. If and when SubApp n of the original protected application discussed becomes requested once again, operations again reach step 2130 and check CTR for SubApp n. This time, CTR informs step 2130 that SubApp n code/data is already decrypted, and operations branch from step 2130 directly to step 2150 to increment CTR in step 2150 and execute SubApp n in step 2155. Note that the branch from step 2130 has increased the efficiency of the system because of bypassing a decryption 2135, a load 2140, and a decryption 2145.

In embodiments herein that use CTR as a flag, efficiency is increased by bypassing as just noted. In embodiments that use CTR as a counter, efficiency is increased not only by the bypassing but also by providing activity count information to maintenance software in secure mode to support a policy of maintaining or overwriting a SubApp with another SubApp, such as by a least frequently used (LFU) policy, least recently used (LRU) policy, or other maintenance policy for Secure RAM. When a SubApp is to be removed from Secure RAM, the maintenance software resets CTR.APSID for SubApp n to zero, and obliterates SubApp n code/data and SubApp n Wrapper and the key Kcode from Secure RAM.

It is noted that variants of this embodiment keep some less space-consuming elements such as Kcode or SubApp n Wrapper in the Secure RAM while overwriting perhaps more space-consuming material like SubApp n code/data. For example, Kcode may be a key used to decode all the SubApps in an application. In such case, auxiliary bits are provided and processed to keep track of the presence of Kcode if data/code for any other SubApp of that application still resides in Secure RAM. An additional wrapper-specific bit is suitably provided to keep track of the presence or absence of SubApp n Wrapper in Secure RAM.

Figure 11:
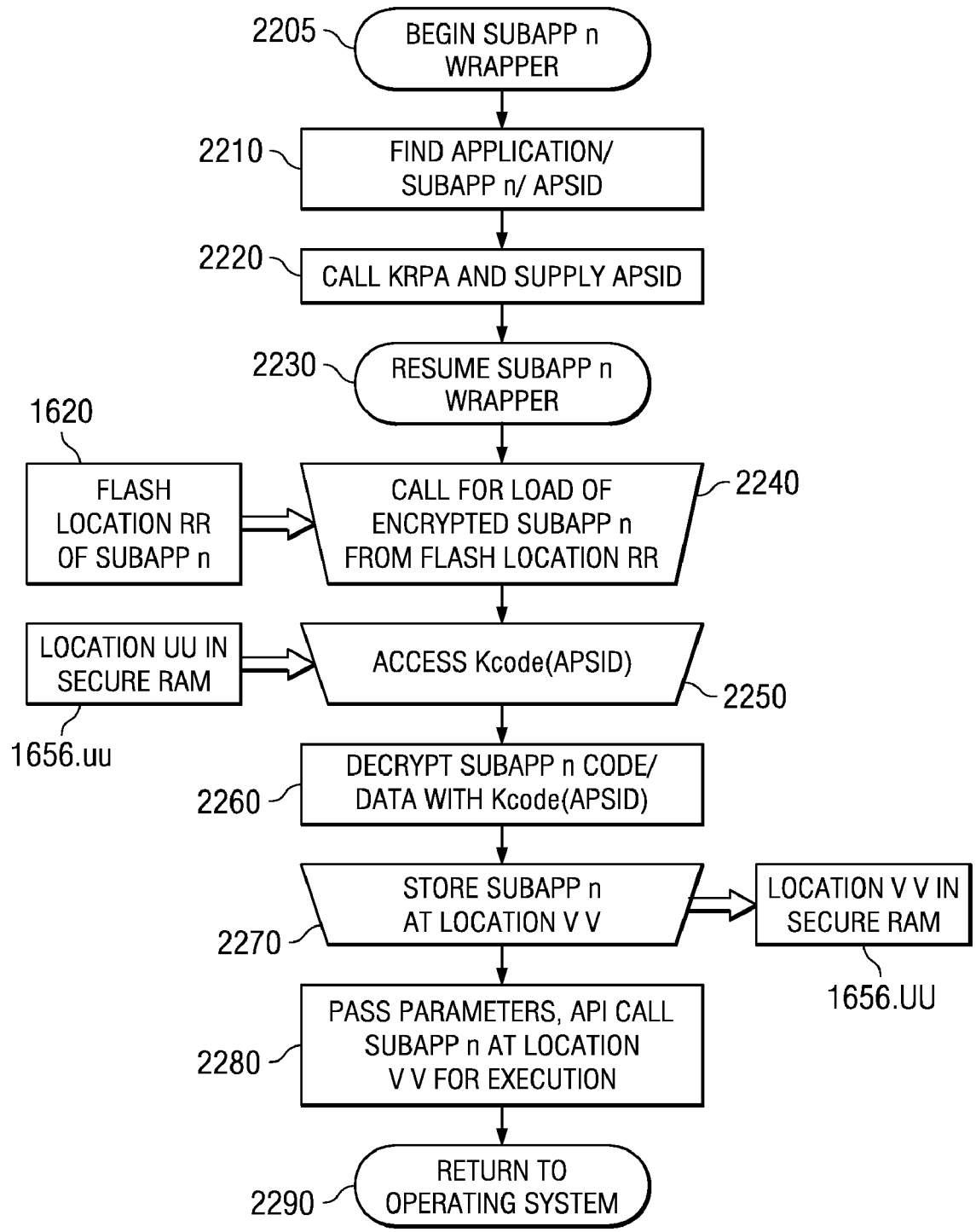
FIG. 11 is a flow diagram of an inventive sub-application SubApp n Wrapper for an inventive run-time process of control and signal processing and the SubApp n Wrapper calling a key retrieval protected application KRPA of FIG. 12.
Figure 12:
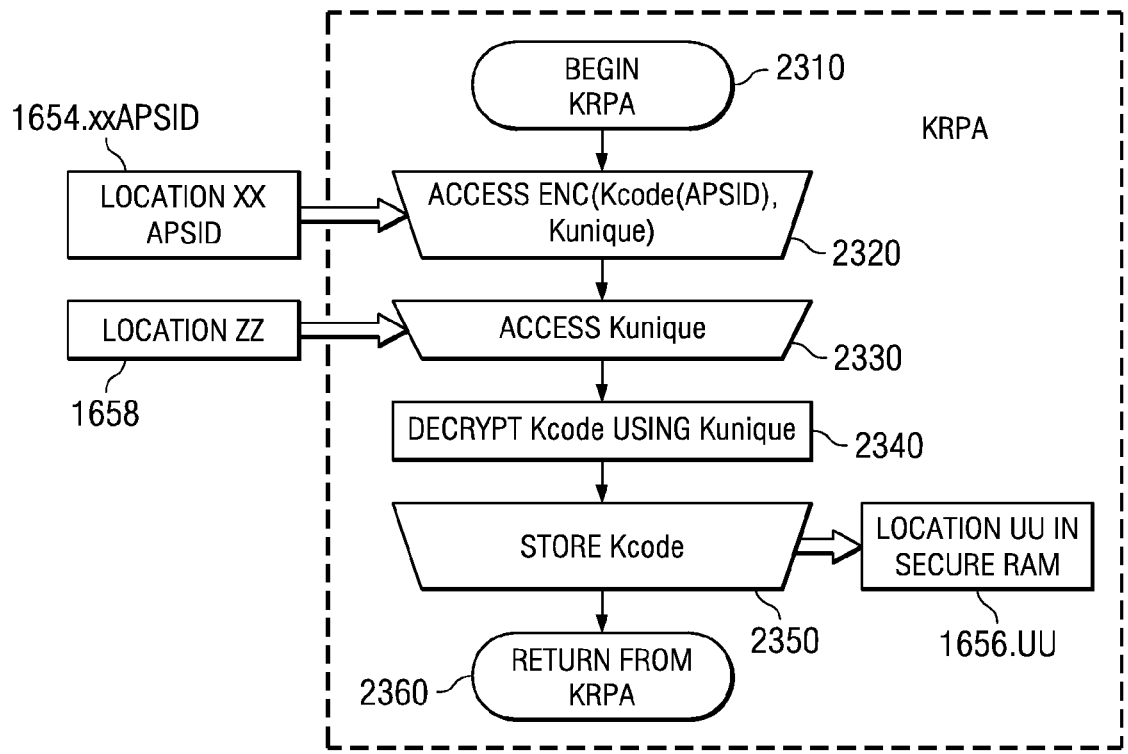
FIG. 12 is a flow diagram of an inventive key retrieval protected application KRPA called by a sub-application SubApp n Wrapper of FIG. 11 in an inventive run-time process of control and signal processing.

FIG. 12 together with FIG. 11 show another alternative embodiment for establishing a system and process for controlling run-time processing. Various controls are partitioned between the SubApp n Wrapper of FIG. 11 and the key retrieval KRPA of FIG. 12.

In FIG. 11, SubApp n Wrapper has a BEGIN 2205. A secure hardware-protected mode is invoked if operations are not already in secure mode. Then a step 2210 identifies the APSID for the particular protected application PA and the SubApp n therein. A counter CTR check, like step 2130 of FIG. 10, is suitably applied if used at step 2210 of FIG. 11, and in such case the bypass goes to step 2280.

A succeeding step 2220 calls code that herein is called a "function" meaning accessible software such as a protected application, subroutine, or library code, including but without limitation to any narrower computer science definition of the term "function." The function in some embodiments is provided in the flash or processor for use by other applications and sub-applications and not found in each wrapper itself, thereby saving space and handshaking with authorized platforms. In other embodiments, the function is replicated in each wrapper itself to assure that the function is available.

An example of the function is key retrieval KRPA. Step 2220 calls KRPA and supplies the APSID to KRPA. KRPA either returns the appropriate key Kcode needed to decrypt the SubApp n with that APSID value, or a location UU at which to access Kcode. Operations reach a Resume 2230 to resume the SubApp n Wrapper itself. The SubApp n Wrapper at step 2240 calls for a load of encrypted SubApp n data/code from a predetermined location RR in Flash memory 1620. The location may be predetermined, directly or indirectly.

A next SubApp n Wrapper step 2250 calls for access of key Kcode corresponding to APSID from a storage location UU in Secure RAM 1656. Depending on embodiment, the storage location is established randomly or by calculation and returned at step 2220 by key retrieval KRPA for access and use by the SubApp n Wrapper thereafter at step 2250. In other words, the code to access the storage location 1656.UU is included in the function call as a field or variable to which the function KRPA returns as additional output the address of the storage location. Alternatively, the storage location UU is predetermined and the location address itself is included in the wrapper code and is specified or not to the function KRPA as may depend on embodiment.

The wrapper calls in a step 2260 for decryption of the encrypted SubApp n code/data using the key Kcode from storage location UU. In other words, the wrapper accesses and uses the contents thus accessed from the storage location UU, which are not known in advance to the wrapper, as that key Kcode. A further step 2270 stores SubApp n code/data thus decrypted at a predetermined location VV in Secure RAM. Counter CTR maintenance analogous to step 2150 of FIG. 10 is suitably applied at step 2270 as well. A succeeding step 2280 passes parameters for an API call to run SubApp n code starting at location VV, and run-time performance of software and content is achieved whence a RETURN 2290 to OS is reached.

In FIG. 12, key retrieval KRPA commences at BEGIN 2310. KRPA has been called by step 2220 of SubApp n Wrapper delivering APSID from FIG. 11, for instance. Next KRPA in FIG. 12 has a step 2320 to call for access of the encrypted form ENC(Kcode, Kunique) from a predetermined Secure RAM 1654 location XX.APSID that depends on the value of APSID. A further step 2330 accesses the chip-specific value of key Kunique from a predetermined location ZZ of secure non-volatile space 1658. A step 2340 calls for decryption of ENC(Kcode, Kunique) using Kunique to recover Kcode itself. This Kcode is the appropriate key needed to ultimately decrypt SubApp n in FIG. 11. KRPA of FIG. 12 has a step 2350 that calls for storing the recovered Kcode into Secure RAM 1656 predetermined location UU, whence a RETURN 2360 from KRPA is reached. For example, operations suitably return from RETURN 2360 of FIG. 12 to Resume 2230 of FIG. 11, and supply the location address UU if the SubApp wrapper of FIG. 11 doesn't already have it.

In key suffix embodiments, FIG. 12 step 2320 involves an encrypted form such as ENC(Kcode.APSID, Kunique.APID) or otherwise based on derived keys from Table 2.

Step 2330 accesses Kunique itself from location ZZ and then generates Kunique.APID using a cryptographic function f3 so that Kunique.APID=f2(Kunique, APID). Then step 2340 calls for decryption of ENC(Kcode.APSID, Kunique.APID) using Kunique.APID to recover Kcode.APSID for storage in step 2350 and use in FIG. 11 step 2260 SubApp decryption. Analogous description pertains to various combinations of Null, APID, and APSID of FIG. 2 as applied to FIG. 12.

In FIGS. 13-16, various further embodiments have one or more of the following. KPPA acts as a carrier for KRPA into the chip. Key Kshared is handled in a volatile manner and not loaded or built into the chip. Decryption and encryption and hashing are handled on a software basis. KRPA is stored with re-encrypted form ENC(Kcode, Kunique) in non-volatile space on-chip. Other distinctive features will also be evident from these FIGS. 13-16 and the detailed description herein. Key suffix variations are applicable to FIGS. 13-16 in a manner already described without need of further elaboration.

Figure 13:
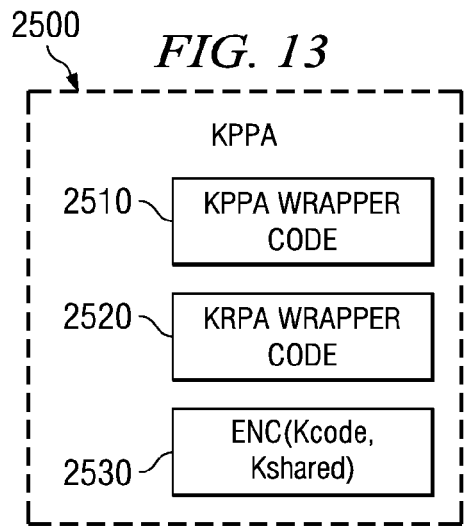
FIG. 13 is a module diagram of an inventive key programming protected application KPPA alternative to the KPPA of FIG. 4.

In FIG. 13, a key programming KPPA 2500 has a KPPA Wrapper 2510 with wrapper code. Notice that this is a wrapper 2510 pertaining to the key programming KPPA and not to a particular SubApp n. Further associated with KPPA 2500 is KRPA wrapper code 2520 and the encrypted form 2530 designated ENC(Kcode, Kshared). In effect, KRPA is a wrapper for ENC (Kcode, Kshared).

Figure 14:
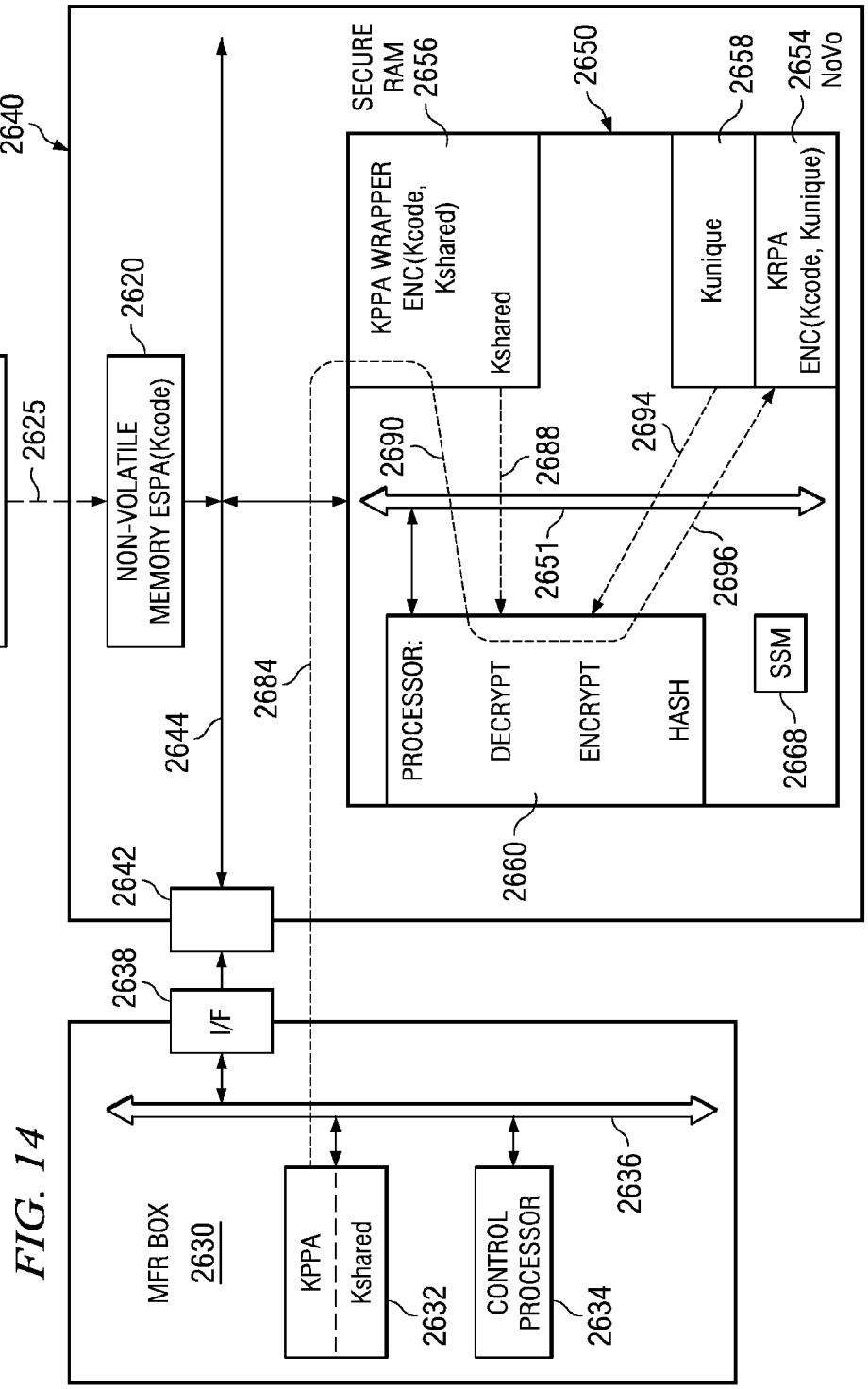
FIG. 14 is a block diagram of inventive alternative structures and inventive alternative processes both for manufacture of production units in the process of FIG. 1 and for distribution over wireless or internet of information product software and content to user devices.

KPPA wrapper 2510 of FIG. 13 is temporarily situated in Secure RAM 2656 of FIG. 14. KPPA wrapper 2510 has code that first calls for decryption of ENC (Kcode, Kshared) using key Kshared to obtain Kcode itself. Further, the KPPA wrapper code calls for encryption of the obtained Kcode with the Chip-Specific key Kunique on-chip. Note that the KPPA wrapper 2510 is written without knowing the values of either Kshared or Kunique. At manufacturing time or subscription time, KPPA wrapper 2510 is executed and its wrapper code suitably accesses a first predetermined memory address in a manufacturer's off-chip box 2630 for key injection to get shared key Kshared. Then the KPPA wrapper code 2510 further accesses a second predetermined memory address in on-chip EPROM 2658 to obtain Kunique for the re-encryption process. Then the KPPA wrapper 2510 calls for encryption software running on processor 2660 to perform the re-encryption with key Kunique.

Key retrieval KRPA 2520 of FIG. 13 has associated with it the encrypted form ENC(Kcode, Kunique) 2530. At test time or run-time, that code KRPA 2520 is executed and suitably accesses on-chip non-volatile memory 2658 to obtain device-specific key Kunique. That code KRPA 2520 then calls for on chip software decryption of the encrypted key Kcode by using the Chip-Specific key Kunique.

After KRPA 2520 executes to recover key Kcode itself and hold it in secure RAM memory space, operations return to the OS. OS then calls the ESPA application/SubApp wrapper in space 2620, which executes to decrypt the ESPA in secure mode using the recovered key Kcode itself.

In FIG. 14, different companies, entities or divisions in a manufacturing process 1100 of FIG. 1 are independently responsible for their respective type of key Kcode, Kshared, Kunique. For instance, the Application Developer 1110 establishes the symmetric key Kcode. The Manufacturer establishes the shared key Kshared and provides Kshared to the Application Developer, and Manufacturer uses the key Kshared on the manufacturing floor as well. The chip maker establishes the chip-specific key Kunique and manufactures a different key value of Kunique into each processor chip. Kshared is not needed by the chip maker in this alternative process that culminates in FIG. 14. Each such company does not need to be in a position to recommend particular key selections or values to any of the other companies to establish a key for which the other company is alone responsible.

The key generating processes herein are flexible and permit alternative approaches, such as providing for the Application Developer to establish both keys Kcode and Kshared and deliver ESPA, KPPA, and Kshared to Manufacturer. Various embodiments are provided as convenient improvement upgrades to unimproved platform software that might already be present in the supply chain.

FIG. 14 has a flash programmer 2610 connected by a line 2615 to a non-volatile memory chip 2620 that is inserted into a printed circuit board 2640. The flash programmer is provided with ESPA(Kcode) including the SubApp Wrappers to program into each memory chip 2620. A manufacturing box 2630 has a memory 2632, control processor 2634, bus 2636 and interface I/F 2638 interconnected with one another. Manufacturing box memory 2632 has key Kshared itself as well as the composite KPPA 2500 of FIG. 13.

Further in FIG. 14, printed circuit board 2640 has memory 2620 and a processor chip 2650. An attachable-and-detachable coupling 2642 is coupled to a bus 2644 and to a processor chip 2650. In this way printed circuit board 2640 as a latest unit in a series of mass-produced units passes by manufacturing box 2630 to have KPPA and key Kshared injected into each unit. Note that a wireless interface such as Bluetooth short distance wireless or RFID transponder technology or any other suitable wireless interface is operated under secure conditions and suitably used as an alternative secure wireless coupling. Board 2640 may be directly produced, or may be part of a system or include a system as in FIG. 9. For user subscriptions, the process suitably is performed over the Internet by e-commerce subscription by wireline or wireless.

In FIG. 14, processor chip 2650 has a processor core 2660 and decrypt, encrypt and hash hardware accelerators may be present or absent. If absent, these functions are handled by software designated Decrypt, Encrypt, and Hash executing on processor core 2660. A hardware secure state machine SSM 2668 protects secure memory spaces. A bus 2651 couples various cores and memories on processor chip 2650 to one another. A bus segment 2684 couples processor chip 2650 to bus 2644 and memory 2620 and SDRAM of printed circuit board 2620. A non-volatile memory NoVo 2654, a Secure RAM 2656, and a secure non-volatile space 2658 for a chip-specific value of key Kunique are provided on chip 2650.

FIG. 14 is compared and contrasted with FIGS. 6A/6B. Trailing digits in the structural numerals of FIG. 14 and FIGS. 6A/6B are provided to facilitate comparison and analogy as well as to show distinctive differences between the embodiments. Control processor 2634 transfers and injects the key programming KPPA 2500 and key Kshared from manufacturing box 2630 memory 2632 into Secure RAM 2656 of now-powered chip 2650 in production unit 2640, see arrow 2684.

Processor core 2660 takes control and disaggregates the KPPA 2500 by executing the KPPA Wrapper code 2510. KRPA 2520 is transferred from Secure RAM 2656 to NoVo 2654 for use later at run-time. Per arrow 2688, key Kshared is used by Decrypt software to decrypt the encrypted form ENC (Kcode, Kshared) 2530 per arrow 2690 and recover and deliver Kcode to encryption software processing. Thereupon, Kcode is encrypted and bound to the chip 2650 using key Kunique per arrow 2694 and delivered to on-chip NoVo 2654 as a re-encrypted form ENC(Kcode, Kunique) per arrow 2696. Processor chip 2650 powers down. KPPA wrapper 2510, encrypted form ENC(Kcode, Kshared) and shared key Kshared all vanish from Secure RAM 2656. Recovered key Kcode itself is obliterated by this time, or vanishes on power-down if the embodiment has allowed Kcode to remain until power-down. KRPA 2520 and re-encrypted form ENC(Kcode, Kunique) remain in NoVo 2654 on-chip. Kunique remains in secure non-volatile space 2658.

Figure 15:
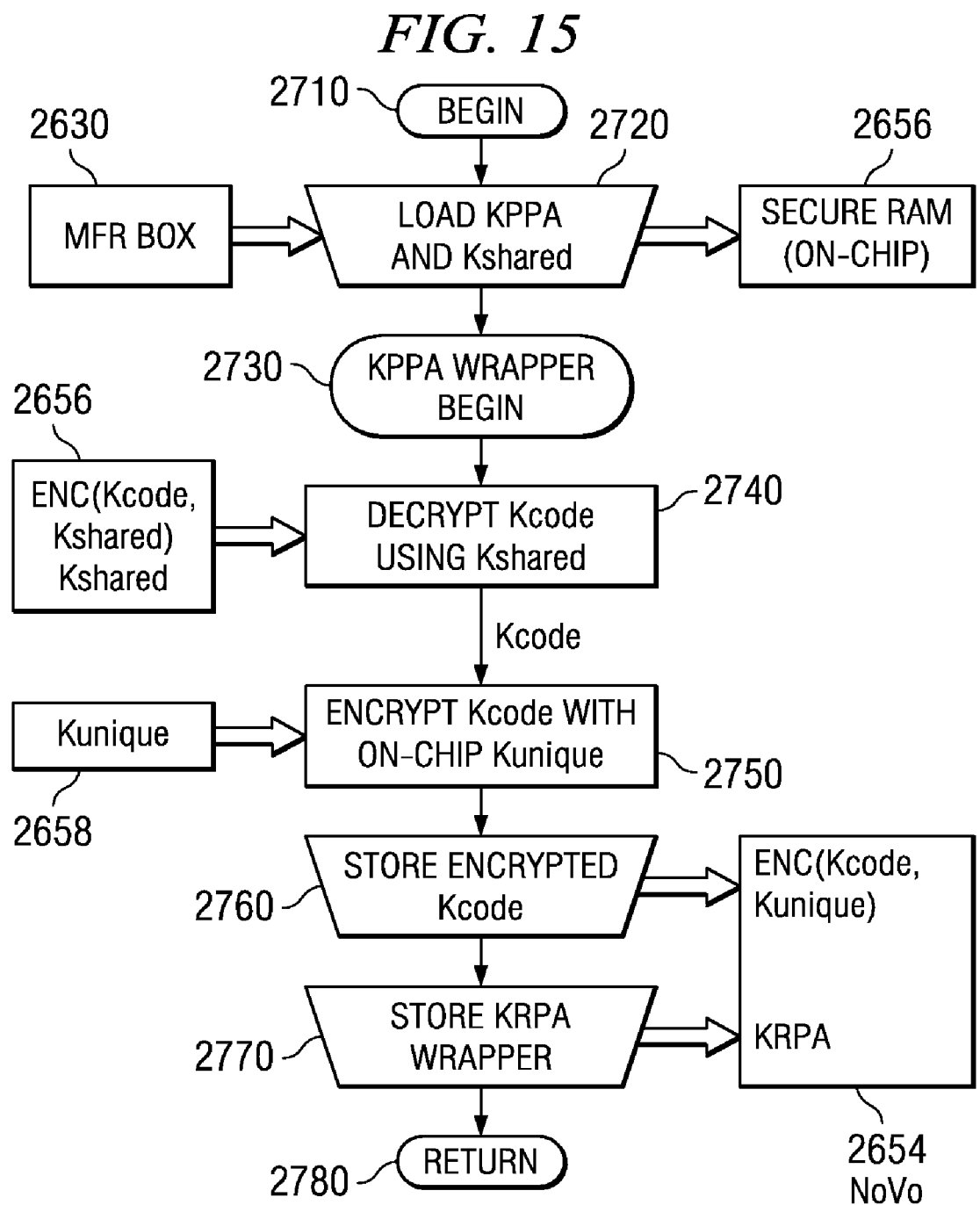
FIG. 15 is a flow diagram of an inventive alternative process of manufacture including a process of operation and data structure for the KPPA of FIG. 13.

In FIG. 15, manufacturing (and user e-commerce) operations including KPPA 2500 operations are shown in flow diagram form. Operations commence with a BEGIN 2710 and then a step 2720 loads KPPA and key Kshared from manufacturing box 2630 (or Internet vendor) to Secure RAM 2656 on processor chip 2650. Control transitions to KPPA Wrapper 2510 BEGIN 2730 and key-injection proceeds to a step 2740 in KPPA Wrapper 2510. Operations of processor core 2660 under control of the KPPA Wrapper step 2740 access predetermined locations in Secure RAM 2656 to get ENC(Kcode, Kshared) and key Kshared, and then call the Decrypt software available to processor 2660. Execution of the Decrypt software recovers and delivers key Kcode itself to Encrypt processing of step 2750. Step 2750 accesses chip-specific value of key Kunique from its secure on-chip non-volatile space 2658 and uses Kunique to encrypt Kcode. Succeeding step 2760 stores the encrypted form ENC(Kcode, Kunique) to NoVo 2654. Step 2770 stores the KRPA 2520 to NoVo 2654 as well, whence a RETURN 2780 is reached. Manufacturing decouples manufacturing box 2630 interface 2638 from printed circuit board interface 2642, and couples box 2630 to a next successive printed circuit board of a next production unit on the manufacturing floor. In the e-commerce version of the same FIG. 15 operations, the e-commerce transaction (movie rental, rights-protected song download, etc.) is fulfilled and the e-commerce session ends.

Figure 16:
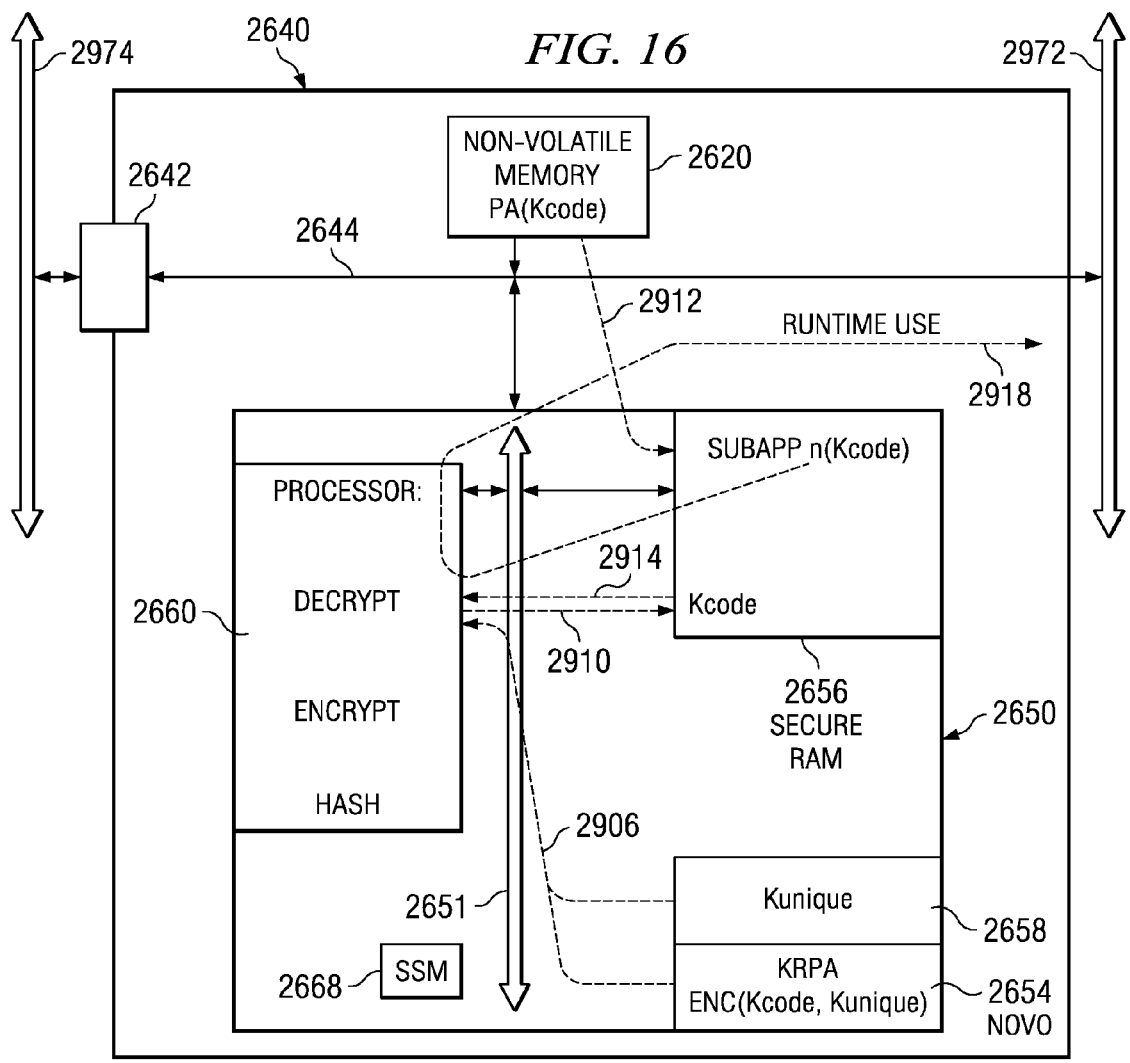
FIG. 16 is a block diagram of an inventive production unit of FIG. 14 with arrows showing an inventive run-time process of control and signal processing superimposed on the structural blocks of the unit.

In FIG. 16, run-time test and/or use operations have OS API call to the protected application ESPA(Kcode). Control passes to SubApp n Wrapper of FIGS. 10, 11, 14, 16, which calls KRPA. Key retrieval KRPA of FIGS. 12, 13, 14, 15, 16 calls decryption processing to use Kunique to decrypt ENC (Kcode, Kunique) to recover Kcode itself, see arrows 2906 and 2910. One or more encrypted SupApps are transferred from non-volatile memory 2620 to Secure RAM 2656, per arrow 2612. SubApp wrapper calls Decryption. Then Decryption processing uses key Kcode per arrow 2914 to decrypt SubApp n(Kcode) code/data from Secure RAM 2656 to recover and deliver decrypted SubApp n code/data into Secure RAM. Processor 2660 executes the recovered SubApp n code to achieve run-time performance and content rendition per arrow 2918 to busses 2972 and 2974 and the user peripherals of FIG. 9, whereby the user experience is provided.

ASPECTS (See explanatory notes at end of this section)

1A. The electronic device claimed in claim 1 wherein said non-volatile store includes the function itself that is called by the code.

1B. The electronic device claimed in claim 1A wherein the function comprises a key programming protected application.

1C. The electronic device claimed in claim 1 wherein a said wrapper further has a representation of code, prior to the decryption call, to load the encrypted sub-application corresponding to the application-specific identification.

1D. The electronic device claimed in claim 1 wherein the code to access the storage location is included in the function.

1E. The electronic device claimed in claim 1 wherein said representation of code of a said wrapper includes a pass of a parameter for execution of the decrypted sub-application.

1F. The electronic device claimed in claim 1E wherein said representation of code of a said wrapper includes an adjust code to adjust the flag.

1G. The electronic device claimed in claim 1E wherein said processor is on a chip that has an on-chip non-volatile store that includes the function, and the first-named non-volatile store is off-chip.

1H. The electronic device claimed in claim 1 wherein the function comprises a key retrieval application that includes a call for access to information in a second storage location that depends on the application specific identification, a call for access to a third storage location and key generation of a key jointly from data from the third storage location and the application specific identification, and a call for decryption of the information of the second storage location using a key resulting from the key generation, and a store of the decryption result as the contents to the first-named storage location.

9A. Additional inventive aspects in combination with others comprise additionally storing an encrypted application that has been encrypted with the first key.

9B. Additional inventive aspects in combination with others comprise wherein said key retrieval application is further for calling decryption of the encrypted application using the first key from decrypting of the second encrypted form.

9C. Additional inventive aspects in combination with others comprise wherein the operating of the processor chip stores the second encrypted form in a non-volatile form inside the processor chip.

9D. Additional inventive aspects in combination with others comprise wherein the key retrieval application is provided in the non-volatile form inside the processor chip.

9E. Additional inventive aspects in combination with others comprise wherein the key retrieval application is provided in the non-volatile storage.

9F. Additional inventive aspects in combination with others comprise wherein the loading loads the first encrypted form of the first key from the non-volatile storage.

9G. Additional inventive aspects in combination with others comprise wherein the loading includes loading a shared key, and the operating step decrypts the first encrypted form with said shared key.

9H. Additional inventive aspects in combination with others comprise use with a processor chip having a stored shared key, the process further including supplying an application specific identification, deriving a decryption key jointly from the shared key and the application specific identification and using the decryption key to do said decrypt of the first encrypted form of the first key.

14A. Additional inventive aspects in combination with others comprise wherein a said wrapper includes a plurality of sub-application wrappers corresponding to a plurality of the encrypted sub-applications respectively.

14B. Additional inventive aspects in combination with others comprise wherein a said wrapper further has a representation of code, prior to the decryption call, to load the encrypted sub-application corresponding to the application-specific identification.

14C. Additional inventive aspects in combination with others comprise wherein the code to access the storage location is included in the function.

14D. Additional inventive aspects in combination with others comprise wherein a said wrapper further has a representation of code, prior to the call to the function, to invoke a secure mode.

14E. Additional inventive aspects in combination with others comprise wherein said representation of code of a said wrapper includes a pass of a parameter for execution of the decrypted sub-application.

14F. Additional inventive aspects in combination with others comprise wherein said representation of code of a said wrapper includes a decryption bypass flag and an adjust code to adjust the flag prior to the pass of a parameter.

14G. Additional inventive aspects in combination with others comprise a signature collectively for at least one of the encrypted sub-applications and associated application specific identification and wrapper.

14H. Additional inventive aspects in combination with others comprise wherein the at least one wrapper has a representation of code to call a function and supply a said application-specific identification to the called function to determine a storage location and access the storage location for contents and to call for decryption of the encrypted sub-application using the contents of the storage location as a key.

14J. Additional inventive aspects in combination with others comprise wherein the at least one wrapper has a representation of code to call a function to access a storage location for contents and supply a said application-specific identification to the called function to generate a derived key jointly as a function of the contents of the storage location and the application-specific identification to call for decryption of the encrypted sub-application using the derived key.

19A. Additional inventive aspects in combination with others comprise wherein said identifications identify the application and sub-applications to the sub-application wrappers.

19B. Additional inventive aspects in combination with others comprise wherein at least one of said wrappers includes a representation of code to call a function and supply a said application-specific identification to the called function to determine a storage location and access the storage location for contents and to call for decryption of the encrypted sub-application using the contents of the storage location as a key.

21A. Additional inventive aspects in combination with others comprise wherein said storage stores an encrypted form of the first key encrypted with a second key, the encrypted form for use by the key programming application.

21B. Additional inventive aspects in combination with others comprise wherein said storage stores the second key itself for use by the key programming application.

21C. Additional inventive aspects in combination with others comprise the electronic device having an encrypted form of the first key encrypted with a second key, the encrypted form for use by the key programming application, and wherein said storage in the manufacturing apparatus stores the second key itself for use by the key programming application.

21D. Additional inventive aspects in combination with others comprise wherein the key programming application instruction code represents at least one operation to generate a device-unit-bound form of the first key for a particular unit of the telecommunication device.

21E. Additional inventive aspects in combination with others comprise a loader tool adapted to facilitate loading of the key programming application.

21F. Additional inventive aspects in combination with others comprise wherein said loader tool has code to load the processor chip with initialization software and transfer control to the processor chip to execute the initialization software to load the key programming application.

21G. Additional inventive aspects in combination with others comprise wherein said control processor is further operable to inject a key retrieval application for run-time decryption of a device-unit-bound form of the first key to recover the first key itself.

21H. Additional inventive aspects in combination with others comprise wherein said interface is operable for connection and disconnection of a unit in manufacture.

Notes: Aspects are paragraphs of detailed description which might be offered as claims in patent prosecution. The above dependently-written Aspects have leading digits and internal dependency designations to indicate the claims or aspects to which they pertain.

Other Types of Embodiments

The structures and processes described herein facilitate operations in RISC (reduced instruction set computing), CISC (complex instruction set computing), DSP (digital signal processors), microcontrollers, PC (personal computer) main processors, math coprocessors, VLIW (very long instruction word), SIMD (single instruction multiple data) and MIMD (multiple instruction multiple data) processors and coprocessors as single cores, multithreaded cores, and multiple cores and in other integrated circuits and arrays and systems. Various embodiments as taught herein are useful in other types of integrated circuits such as ASICs (application specific integrated circuits) and gate arrays and to all circuits involving processes to which the advantages of the improvements described herein commend their use.

In addition to inventive structures, devices, apparatus and systems, processes of manufacture, information products and processes of operation are represented and described using any and all of the block diagrams, logic diagrams, and flow diagrams herein. Block diagram blocks are used to represent process steps and portions of process flows as well as structures. Flow diagram symbols herein represent portions of structure as well as process steps and portions of process flows, states, and transitions in software and hardware in various embodiments of the invention.

It is emphasized that the flow diagrams are generally illustrative of a variety of ways of establishing the flow, and the specific order and interconnection of steps is suitably established by the skilled worker to accomplish the operations intended. It is noted that, in some software and hardware and mixed software/hardware embodiments, the steps that execute instructions as well as steps that perform other operations in the flow diagrams are suitably parallelized and performed concurrently. Other embodiments in hardware or software or mixed hardware and software do the steps serially. Some embodiments virtualize or establish in software form advantageous features taught and suggested herein.

A few preferred embodiments have been described in detail hereinabove. It is to be understood that the scope of the invention comprehends embodiments different from those described yet within the inventive scope. Microprocessor and microcomputer are synonymous herein. Processing circuitry comprehends digital, analog and mixed signal (digital/analog) integrated circuits, digital computer circuitry, ASIC circuits, PALs, PLAs, decoders, memories, non-software based processors, and other circuitry, and processing circuitry cores including processors and microcomputers of any architecture, or combinations thereof. Internal and external couplings and connections can be ohmic, capacitive, direct or indirect via intervening circuits, or by wireless couplings or optical or photonic couplings or otherwise as desirable. Implementation is contemplated in discrete components or fully integrated circuits in any materials family and combinations thereof. Various embodiments of the invention employ hardware, software or firmware. Process diagrams herein are representative of flow diagrams for operations of any embodiments whether of hardware, software, or firmware, and processes of manufacture thereof.

While this invention has been described with reference to illustrative embodiments, this description is not to be construed in a limiting sense. Various modifications and combinations of the illustrative embodiments, as well as other embodiments of the invention may be made. The terms "including", "includes", "having", "has", "with", or variants thereof are used in either the detailed description and the claims to denote non-exhaustive inclusion in a manner similar to the term "comprising". It is therefore contemplated that the appended claims and their equivalents cover any such embodiments, modifications, and embodiments as fall within the true scope of the invention.

What is claimed is:

1. An electronic device comprising:
a non-volatile store holding a plurality of encrypted sub-applications, and application-specific identifications to respectively identify the encrypted sub-applications, and at least one wrapper having a representation of code to call a function and supply a said application-specific identification to the called function to determine a storage location and access the storage location for contents and to call for decryption of an encrypted sub-application corresponding to the said application-specific identification in response to contents of the storage location as a content decryption key for the decryption; and
a processor coupled to said non-volatile store and operable for:
at a first time, performing an application for decrypting a first form of an encrypted key with a first key to provide a recovered key, wherein the encrypted sub-application has been encrypted using the recovered key;
at a second time following the first time:
encrypting the recovered key into a second form of an encrypted key using a key unique to the electronic device; and
storing the second form in the storage location; and
accessing the representation of code and executing the code so as to decrypt the encrypted sub-application in response to the second form; and
circuitry for deleting from the electronic device the application for decrypting a first form and the first form of an encrypted key after the first time.

2. The electronic device claimed in claim 1 wherein a said wrapper includes a plurality of sub-application wrappers corresponding to a plurality of the encrypted sub-applications respectively.

3. The electronic device claimed in claim 1 wherein a said wrapper further has a representation of code, prior to the call to the function, to invoke a secure mode.

4. The electronic device claimed in claim 1 wherein said representation of code of a said wrapper includes a check of a flag to selectively bypass the decryption of the encrypted sub-application to go to the pass of a parameter.

5. The electronic device claimed in claim 1 wherein said processor includes an element that has different states depending on whether decryption of a particular sub-application has already occurred or not, and said processor is operable to bypass at least some of the decryption of the encrypted sub-application when the element has a state indicating that decryption of that encrypted sub-application has already occurred.

6. The electronic device claimed in claim 1 further comprising at least one peripheral to form an apparatus selected from the group consisting of 1) cell phone handset, 2) gateway, 3) scanner, 4) camera, 5) voice over packet device, 6) video device, 7) audio device, 8) position-assisted device, 9) personal area network device, 10) set top box.

7. The electronic device claimed in claim 1 wherein the processor is further for, in response to the called function, decrypting the second form to provide the recovered key and decrypting the said application-specific identification in response to the recovered key.

8. The electronic device claimed in claim 1 wherein said non-volatile store includes the function itself that is called by the code.

9. The electronic device claimed in claim 8 wherein the function comprises a key programming protected application.

10. The electronic device claimed in claim 1 wherein a said wrapper further has a representation of code, prior to the decryption call, to load the encrypted sub-application corresponding to the application-specific identification.

11. The electronic device claimed in claim 1 wherein the code to access the storage location is included in the function.

12. The electronic device claimed in claim 1 wherein said representation of code of a said wrapper includes a pass of a parameter for execution of the decrypted sub-application.

13. The electronic device claimed in claim 12 wherein said representation of code of a said wrapper includes an adjust code to adjust the flag.

14. The electronic device claimed in claim 12 wherein said processor is on a chip that has an on-chip non-volatile store that includes the function, and the first-named non-volatile store is off-chip.

* * * * *